(12) United States Patent
Pieronek

(10) Patent No.: US 11,565,672 B2
(45) Date of Patent: Jan. 31, 2023

(54) FAULT TOLERANT MODUALTED TRAILER BRAKING SYSTEM

(71) Applicant: Donald Pieronek, Lake Mills, WI (US)

(72) Inventor: Donald Pieronek, Lake Mills, WI (US)

(*) Notice: Subject to any disclaimer, the term of this patent is extended or adjusted under 35 U.S.C. 154(b) by 438 days.

(21) Appl. No.: 16/296,402

(22) Filed: Mar. 8, 2019

(65) Prior Publication Data

US 2020/0282965 A1 Sep. 10, 2020

(51) Int. Cl.
*B60T 8/32* (2006.01)
*B60T 8/172* (2006.01)
*B60T 8/1761* (2006.01)
*B60T 8/58* (2006.01)
*H04L 12/40* (2006.01)
*B60T 8/171* (2006.01)
*B60T 8/17* (2006.01)

(52) U.S. Cl.
CPC .............. *B60T 8/323* (2013.01); *B60T 8/171* (2013.01); *B60T 8/172* (2013.01); *B60T 8/1708* (2013.01); *B60T 8/17616* (2013.01); *B60T 8/58* (2013.01); *H04L 12/40052* (2013.01); *B60T 2240/00* (2013.01); *B60T 2250/04* (2013.01); *B60T 2270/10* (2013.01); *H04L 2012/40215* (2013.01); *H04L 2012/40273* (2013.01)

(58) Field of Classification Search
CPC ........ B60T 8/323; B60T 8/1708; B60T 8/171; B60T 8/172; B60T 8/17616; B60T 8/58
See application file for complete search history.

(56) References Cited

U.S. PATENT DOCUMENTS 7,741,960 B1 * 6/2010 Hoogenakker ....... B60T 13/662
340/431
2017/0151935 A1 * 6/2017 Prohaszka ............. B60T 8/1755

* cited by examiner

*Primary Examiner* — Imran K Mustafa

(57) ABSTRACT

A system and method of controlling individual trailer brakes on a towed trailer supporting numerous fault tolerant behaviors including activating each operational brake when a brake is shorted. System operates in multiple modes where it operates with traditional brake controllers, operates in a degraded braking mode without a brake controller and in the preferred mode it retrieves vehicle information from tow vehicle and then communicates with a brake actuator controller over the trailer brake wire. When braking system includes wheel sensors traditional antilock releases are provided and unlike other braking systems this brake actuator controller can maintain wheel speeds below the trailer speed reducing or eliminating periodic wheel releases. System also diagnoses the mechanical operation of the trailer brakes including; identifying when brake adjustment is required, when brake friction surfaces are degrading, as well as diagnosing sensors, braking signals and brake actuator interfaces.

19 Claims, 12 Drawing Sheets

FAULT TOLERANT MODUALTED TRAILER BRAKING SYSTEM

TECHNICAL FIELD

Embodiments of the invention relate to braking systems for vehicle trailers.

BACKGROUND OF INVENTION

Existing towed trailer electric braking systems utilize in vehicle, or on trailer, brake controllers that generate braking pulses which are applied to the trailer braking system. An existing hydraulic trailer antilock braking system (ABS) applies braking forces proportional to said braking pulses to all brakes, monitors all wheels with wheel sensors then independently reduces a brake pressure when a wheel speed slows below a release threshold and reapplies a released brake once wheel speed approaches the trailer speed. An existing sway controller receives said braking pulses from a brake controller and independently passes said braking pulses to the left trailer brakes and to the right trailer brakes during normal braking. When a trailer sway event occurs said sway controller applies increasing and decreasing braking pulses to either the left trailer brakes or the right trailer brakes, drawing power from the trailer battery, to reduce trailer sway and if brakes are applied during a sway event then adds said sway control pulses to said brake controller braking pulses. A patent pending antilock braking system utilizes the same approach as existing hydraulic trailer braking system where instead of modulating a solenoid which releases the brakes connects an output to the electric brake magnet and again utilizes common in the art brake releases when a reduced wheel speed threshold is exceeded. All the above braking systems utilize an aftermarket brake controller, or an in dash brake controller, which sends braking pulses to a trailer mounted electronic brake controller via a standardized 7 pin trailer connector which includes a brake wire, a battery charge line connected to the vehicle battery, turn signals, back up lights and where the aftermarket brake controllers utilize an in vehicle 4 pin connector to plug in an aftermarket brake controller. All known brake controllers perform very limited braking diagnostics, where upon detecting a short circuit on the brake wire stop sending brake pulses and thus all trailer brakes are disabled and where when two or more brake magnets are flowing current indicate a valid connection where four of up to six brakes on a triple axle trailer could be disconnected.

All the aforementioned electronic ABS controllers utilize wheel speed sensors to determine when the applied braking pulses cause a wheel to slow below a release threshold where then the braking force is reduced until the wheel speed increases to the trailer speed replicating the operation of tow vehicle antilock braking systems. Trailer owners desire ABS to eliminate tire flat spots, resulting in trailer vibrations, during heavy braking and desire maintaining directional control of the combined tow vehicle and towed trailer system. Although constant brake releases are needed to steer and maintain control of a tow vehicle these constant releases are not necessarily desired at the towed trailer whose applied brakes tend to straighten said tow vehicle and said trailer system sway when applied. The existing sway controllers, ABS controllers and brake controllers do nothing to; maintain braking when current flow through the brake wire is degraded, do nothing to facilitate integration with the tow vehicle braking and collision avoidance systems, nor do they apply brakes when said tow vehicle does not contain a brake controller which generates the braking pulses applied to the brake actuators and do nothing to diagnose the operation of the mechanical braking system.

RELATED US PATENT DOCUMENTS

| | | |
|---|---|---|
| 9,026,311 | May 5, 2015 | Pieronek |
| 9,415,753 | Aug. 16, 2016 | Pieronek |
| 9,016,807 | Apr. 28, 2015 | Pieronek |
| 10,214,188 | Feb. 26, 2019 | Ellwein |
| 10,189,454 | Jan. 29, 2019 | Yamamoto |
| 3,972,543 | Aug. 3, 1976 | Presley |
| 5,042,883 | August 1991 | McCann |
| 5,941,612 | August 1999 | Carpenter |

SUMMARY OF INVENTION

This invention provides a trailer brake actuator controller supporting numerous fault tolerant behaviors and during heavy braking enables maintaining a wheel speed at a selected wheel speed below the trailer speed where this trailer braking may be integrated with the tow vehicle braking system by optionally providing individual wheel speed settings utilizing serial communications with tow vehicle using the existing brake wire connection. This system facilitates achieving maximum deceleration rates by varying the wheel speeds relative to the vehicle speed. Unlike existing trailer brake controllers, when faults occur this system provides alternate modes of operation to apply operational trailer brakes while disabling faulted brakes, as well as performing diagnostic functionality on the mechanical operation of the trailer brakes including; identifying when brake adjustment is required, when brake friction surfaces are degrading, as well as diagnosing brake wire connections, sensors and brake actuator interfaces.

DETAILED DESCRIPTION

Figure 1:
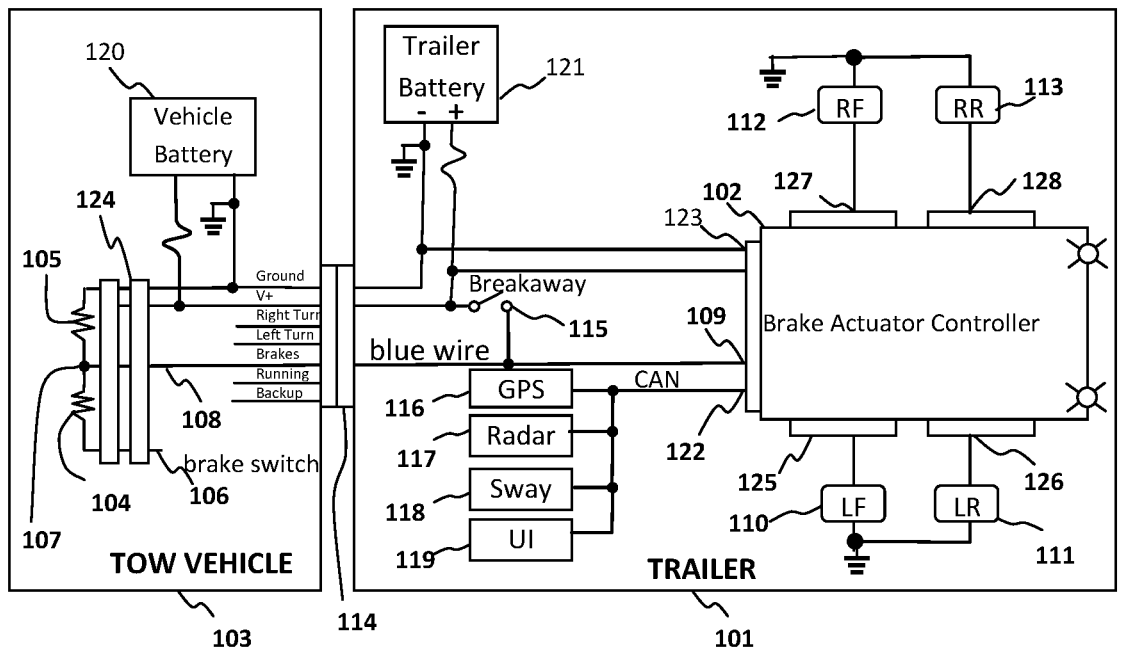
FIG. 1 is a braking system interconnect wiring diagram of one embodiment which provides trailer braking without an in vehicle brake controller.

This invention for a brake actuator controller (102) for trailers (102) utilizing individually controlled brakes where functionality within this invention may be located within one of more control devices. The brake actuator controller (102) and a brake controller (202) optionally contain one or more communication interfaces (network 109, 123) where messages may be conveyed across any medium, such as wire and through the air, where a preferred version conveys binary messages (1004) over an existing brake wire (108). Functionality within this invention may be implemented in various combinations of software and hardware where this invention utilizes a brake actuator controller (102), receiving power from a trailer battery input (123), receiving power from a blue wire interface (109), containing memory configured to store a plurality of instructions; a processor configured to receive signals, to output signals, to optionally receive network messages, to optionally send network messages and to execute the plurality of instructions to deliver the functionality described herein.

FIG. 1 indicates this invention may be implemented in reduced forms where a subset of the functionality described within this invention is included within brake actuator controller (102) where said brake actuator controller may not include wheel sensor interfaces, utilizes a blue wire interface (109) capable of monitoring the blue wire interface voltage and capable of receiving a PWM signal, either of which is used to determine a brake settings (402) value but where said blue wire interface may not be capable of routing a traditional high current pulse width modulated signal (1002) applied to said blue wire interface to the brake outputs (125,126,127,128). In this configuration the blue wire interface (109) pulse widths are monitored to determine the duty cycle of brake pulses (401) to be applied to the brake outputs (125,126,127,128) but where current is drawn from a trailer battery input (123) connected to the trailer battery (121). Although figures indicate four brakes and two axles this invention includes any number of brakes and axles.

Figure 10:
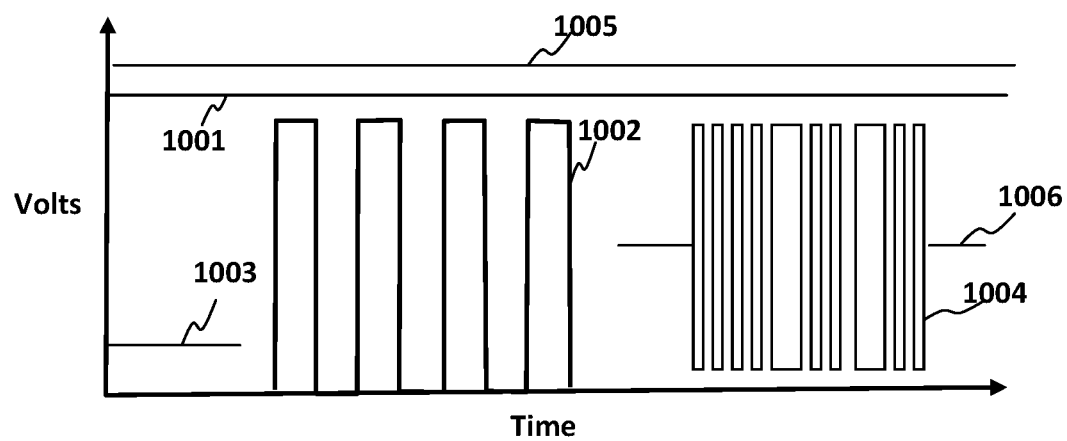
FIG. 10 is a diagram of the various types of blue wire interface signals supported by this invention.
Figure 11:
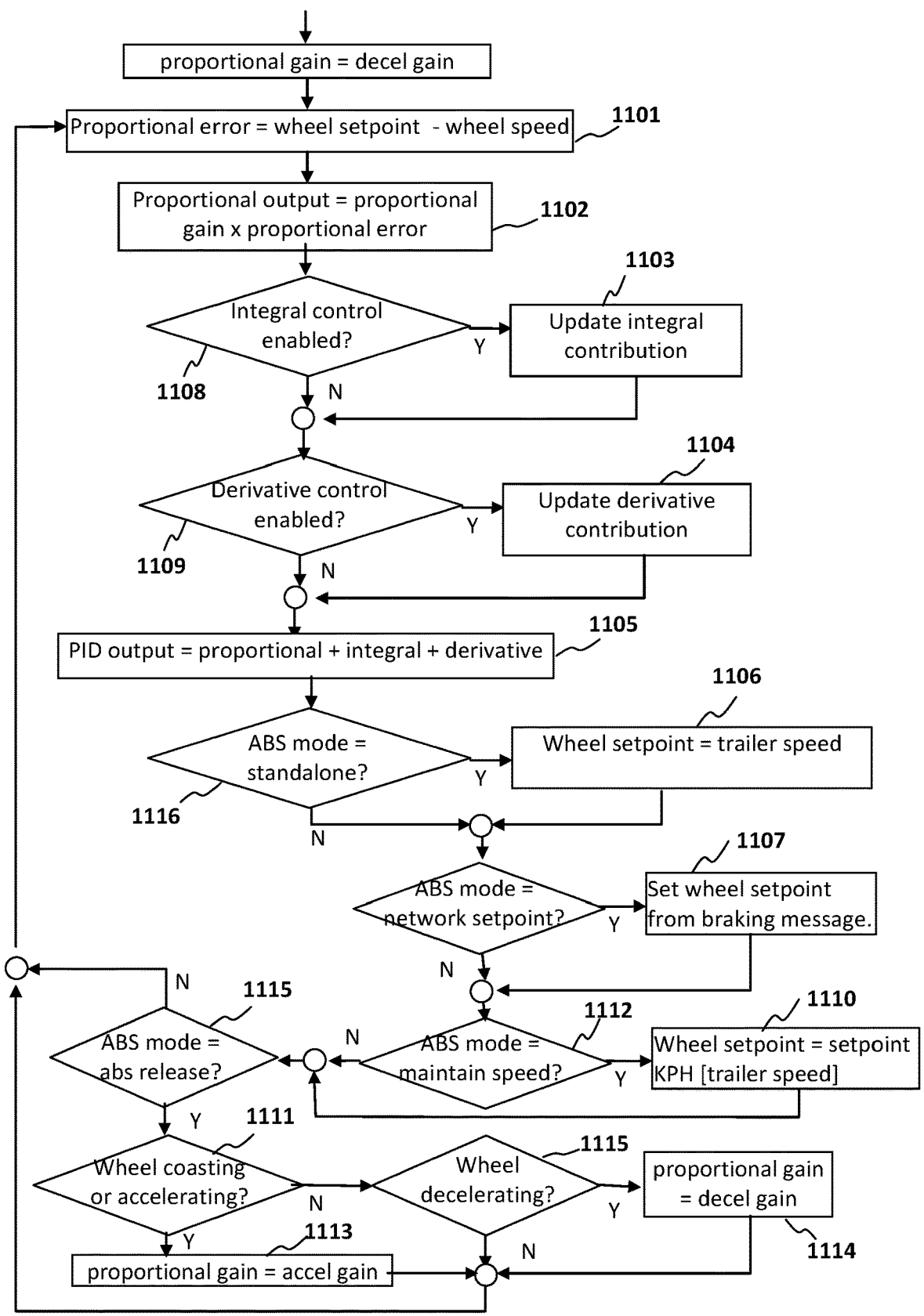
FIG. 11 is a diagram of the usage of Proportional, Integral and Derivation (PID) control of a wheel speed determined by a wheel speed setpoint.

FIG. 10 illustrates four types of signal indications supported by a full featured blue wire interface (109) including; a traditional static breakaway voltage (1001), traditional brake pulses (1002) providing by a traditional brake controller (202), a static voltage (1003) different than said breakaway voltage (1001) unique to this invention, and a binary communications message (1004) also unique to this invention. FIG. 1 illustrates a tow vehicle (103) which is physically connected to a trailer (101), said tow vehicle containing a trailer towing option which includes a standardized brake controller (202) 4 pin connector (124) inside said tow vehicle traditionally utilized to plug in an aftermarket brake controller which then generates a pulse width modulated (PWM) signal (1002), most often at a market standard frequency of 300 Hz, where the PWM duty cycle varies to apply varying levels of power to a trailer brake (110, 111, 112, 113) and thus vary a braking force applied to each of said trailer brakes. This invention enables a trailer (101), containing a brake actuator controller (102) to activate a trailer brake (110, 111, 112, 113) without a traditional vehicle brake controller (202) by utilizing a few as one electronic component (104) connected to a mating 4 pin connector, then said 4 pin connector plugged into a mating vehicle connector (124) within the tow vehicle (103). One resistor (104) may be utilized when the brake actuator controller (102) supports voltage measuring circuits at the blue wire interface (109) where the low load resistance of multiple trailer brakes (110, 111, 112, 113) requires a high power component, such as a 15 watt 10 ohm resistor (104), to provide a unique static voltage level (1003) at the blue wire interface (109) when the brake pedal is pushed, where said brake actuator controller determines the applied voltage level (1003) is not a static trailer breakaway signal (1001) approaching the voltage applied to the trailer battery input (123) nor is it a traditional pulse width modulated signal (1002). The brake actuator controller (102) compares this reduced blue wire voltage (1003) applied to the blue wire interface (109) to the trailer battery voltage (1005) and when the blue wire voltage is within a plug range (901) the blue mode (404) is set to a LOCAL PWM (903) value. The monitor trailer bat (433) measures the trailer battery (121) voltage applied to the trailer battery input (123) and places its value into batt voltage (434) where if a peak blue wire pulse voltage exceeds said batt voltage then plug range utilizes the higher blue wire pulse voltage level in its calculations. The plug range (901) is a blue voltage (416) value that is greater than a minimum plug percentage of the trailer battery voltage (1003) value and less than a maximum plug percentage of said trailer battery voltage value, where a trailer breakaway signal (1001) is determined (910) when the said blue voltage value exceeds a breakaway threshold which is a breakaway percentage of the trailer battery voltage (1005) value where said breakaway percentage value is greater than the maximum plug percentage value and when blue voltage exceeds the breakaway voltage level (1401) the blue setting (415) is set to a maximum braking level (1402). When blue wire voltage is in the plug range (901) blue mode (404) is set to a LOCAL PWM value (903) the brake actuator controller (102) enters a braking mode where PWM braking pulses (401) are generated by the brake actuator controller (102) and applied to one or more trailer brakes (110, 111, 112, 113) drawing current from the trailer battery input (123). This invention utilizes the term braking pulses (401) to describe the electrical PWM pulses applied to a trailer brake (110, 111, 112, 113) where the pulse durations of said braking pulses are determined by a brake setting (402) value, where said brake setting value may be different for each of said trailer brakes and where the source of power for said braking pulses may be either, the vehicle battery (120) when power passing capabilities exist via the blue wire interface (109) or; the trailer battery (121) via the trailer battery input (123), or a combination of both power sources. In the preferred implementation braking pulses would draw power from the trailer battery input (123).

Figure 9:
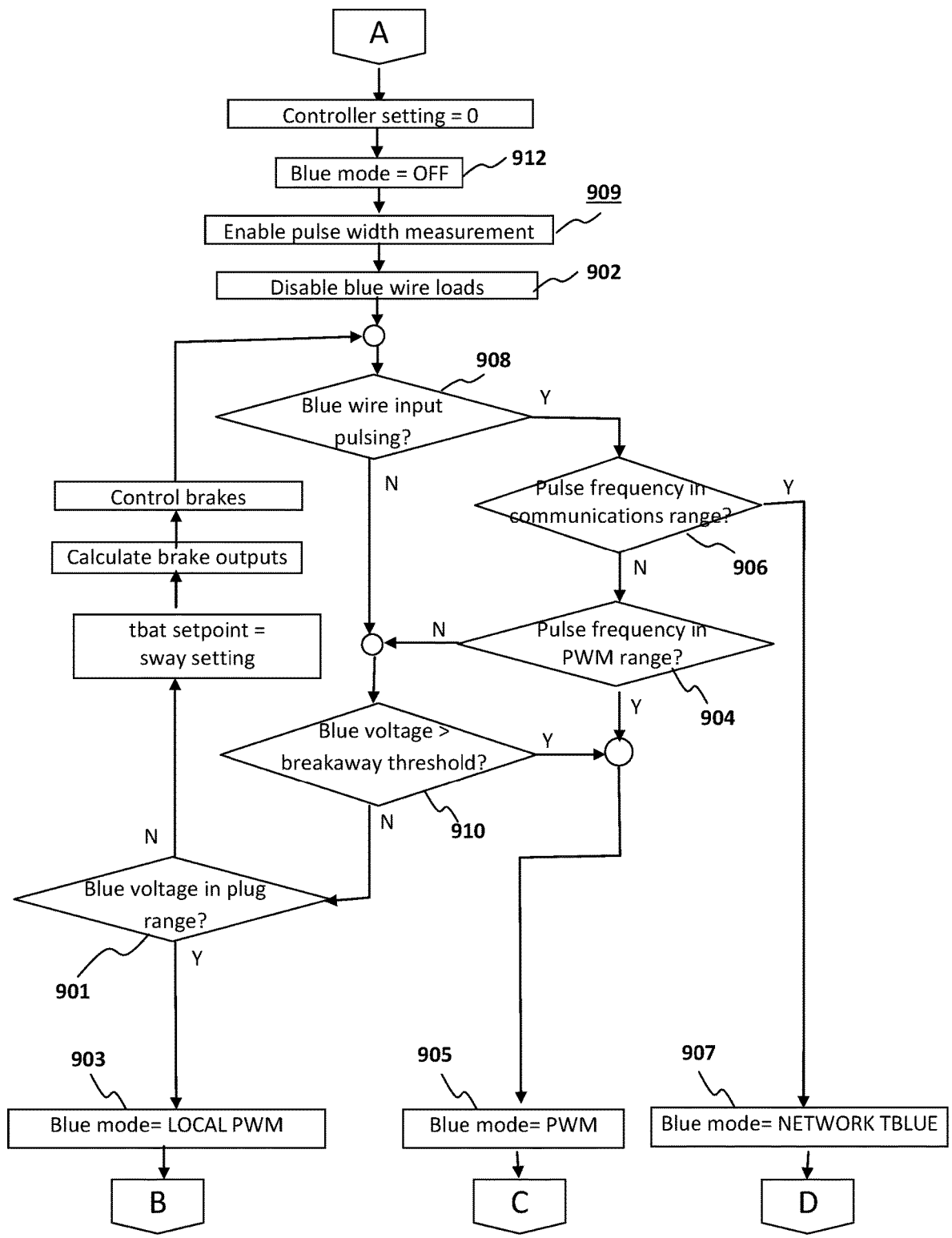
FIG. 9 is a flow chart describing how a plurality of blue wire interface signals is identified based upon an applied blue wire interface signal.

FIG. 9 indicates a preferred implementation when a brake actuator controller (102) supports serial communications (1004) at the blue wire interface (109) this invention sets blue mode (404) to OFF (912), enables blue wire pulse measurement (909) and disables the blue wire loads (902) when determining the type of said blue wire interface signal is being applied to the brake wire (108) by a tow vehicle (103). Thus in the preferred implementation the plug mode may utilize low power resistors to apply a voltage within the plug range. Various circuits may be used at the plug interface, where FIG. 1 connects two readily available low power resistors (104, 105) in series between the brake switch (106) terminal of the 4 pin connector (124) and said connector ground terminal where the series resistor center tap (107) is applied to the brake wire (108) terminal of said connector. When the brake pedal is pushed and when the blue mode (404) is in the OFF state (912) and a blue voltage (416) is then within the plug range (901) then said blue mode is set to LOCAL PWM (903).

Figure 5:
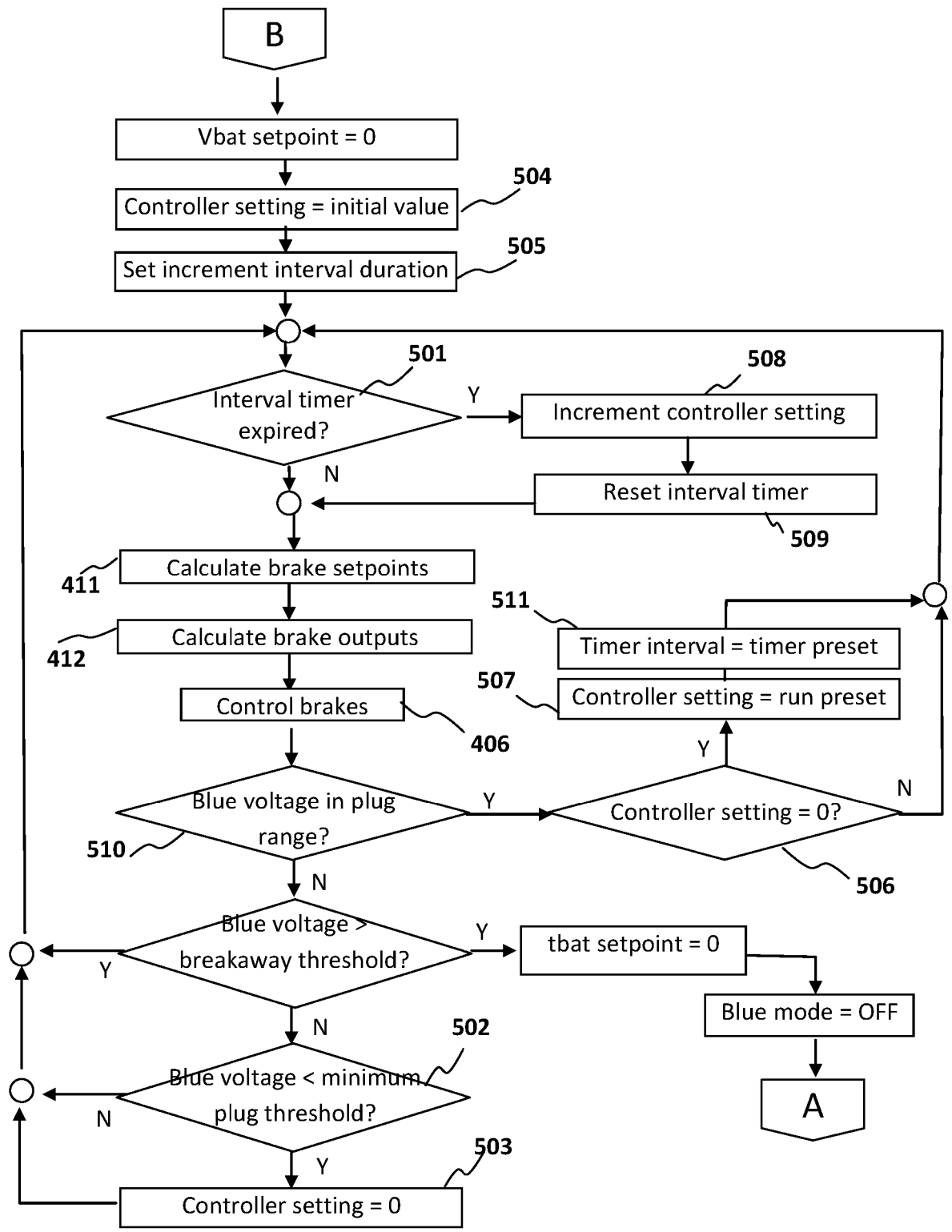
FIG. 5 is a flow chart describing internally generating braking pulses in various modes of operation when a traditional brake controller is not available.

FIG. 5 indicates one implementation of a brake actuator controller (102) operation while in the LOCAL PWM state which, by default, enables traditional time based braking algorithms which increment (508) a controller setting (403) and then the interval timer is reset (509) when said interval timer expires (501) thus increasing said controller setting at said timer interval until the brake pedal is released. When the blue voltage drops below the minimum plug threshold value (502) when the brake pedal is released said controller setting (403) value is set to zero (503).

Unlike traditional timed based braking from a traditional time based brake controller that applies braking pulses (401) to all brake actuators (110, 111, 112, 113) this invention, when in LOCAL PWM mode, draws brake current from the trailer battery input (123) and not from the blue wire interface (109), and timed based braking power levels applied to a brake actuator on one axle (111,113) may be less than said power applied to a brake actuator on another axle (110,112) to compensate for weight shifts between axles during heavy braking scenarios.

Varying braking levels to each of a plurality of brake actuators (110, 111, 112, 113) is achieved when brake pedal is pushed after being released and blue voltage (416) is within plug range (510) and when the controller setting (403) is equal to zero (506) then braking algorithm may optionally provide a different run preset value to the controller setting (507) and may set timer interval to a different timer preset (511) and thus provides a different duty cycle to each axle. The calculate brake setpoint (411) utilizes the blue mode (404) value to select which controller setting (403) value used to set a tbat setpoint (405) value. Control brakes (406) determines when braking current is drawn from the blue wire interface (109) and when current is drawn from the trailer battery input (123) based on values in a brake setting (402) value for each brake and for each power source and then controls the electronic hardware which then applies each PWM duty cycle to each brake output hardware circuit (125,126,127,128), where in this scenario generating braking pulses (401) pulling current from the trailer battery input (123) and thus applying said braking pulses to each brake actuator (110, 111, 112, 113).

A trailer connector (114) for a tow vehicle (103) may or may not be a 7 pin connector, but instead may contain a traditional 4 pin trailer light connector or variances of said trailer light connector where brake lights are controlled via other means, and thus a different circuit may be created which then applies a blue wire interface (109) voltage within the plug range (901) when brake pedal is pushed. Within this invention brake actuator diagnostics, including short circuit detection and open circuit detection are performed; where the detection of a shorted brake will change the output state (407) value and thus control brakes (406) will not apply braking pulses (401) to a shorted brake where said brake pulses will be applied to functional brake actuators, which is not the case when a traditional brake controller is installed in tow vehicle (103).

Configuration of supported parameters within the brake actuator controller (102) for a specific trailer (101), including selection of different braking algorithms, may be performed utilizing an available network interface including a trailer network interface (122) or via a blue wire interface (109) supporting serial communication messages originating from various control devices, where in this scenario configuration may be performed by, but not limited to, a brake controller (202) or a (UI) User Interface (119) control device. Some limited parameter value selections may also be performed via variations in the plug circuitry when plugged into the connector (124) and monitored by the blue wire interface (109), where said blue wire interface signal applied to the blue wire (108) may alter selected behaviors within the brake actuator controller (102) and thus alters the brake pulses (401) applied to the brake actuators (110, 111, 112, 113).

Figure 2:
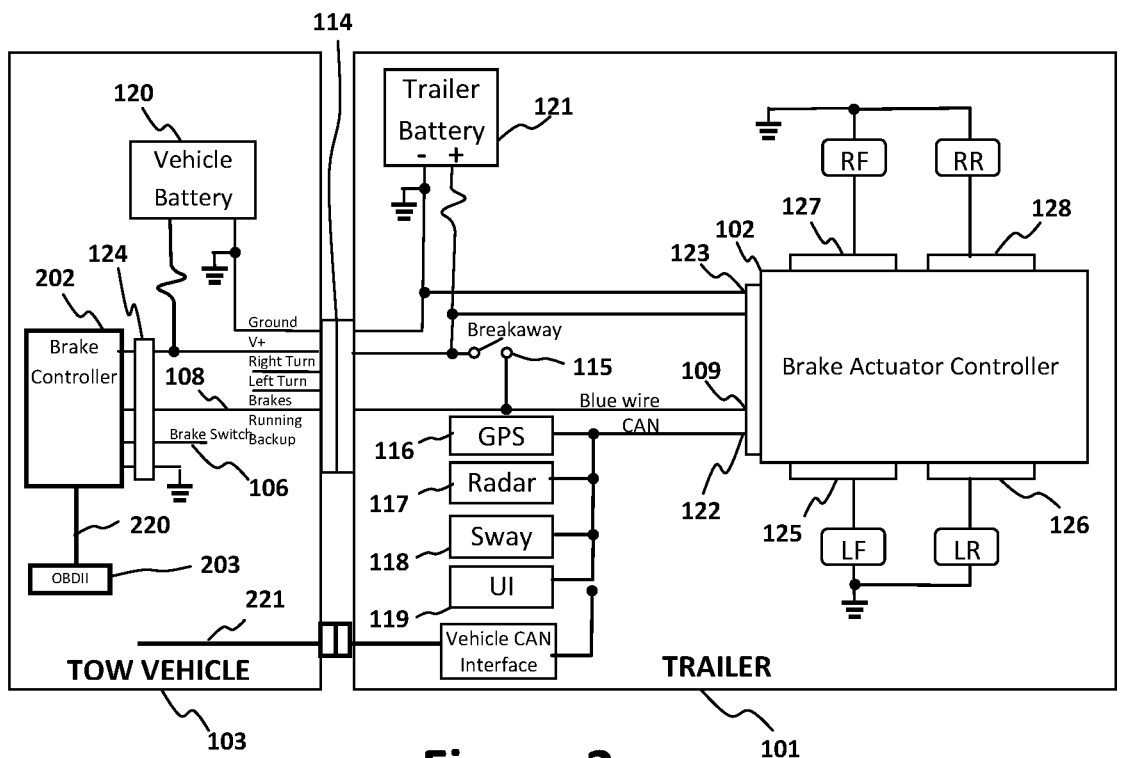
FIG. 2 is a braking system interconnect wiring diagram of one embodiment using a traditional configuration utilizing an in vehicle brake controller or utilizing brake wire for serial communications.

FIG. 2 shows a system configuration optionally including a traditional brake controller (202) providing traditional (PWM) braking pulses (401) to said brake actuator controller which is not capable of, and configured to, pass brake controller (202) generated pulses to the brake outputs (125, 126,127,128). The brake actuator controller (202) detects pulses (908) are applied to the blue wire interface (109) and determines a pulse width modulated signal (1002) is applied and since the frequency is within a PWM frequency range (904), where the blue wire interface frequency exceeds a minimum PWM frequency and is less than a maximum PWM frequency and the brake actuator controller (102) thus sets blue mode (404) to the PWM value (905). When blue mode (404) value is set to PWM the monitor blue input (414) determines the frequency and duty cycle applied to the blue wire interface (109) and places the applied duty cycle into blue setting (415). Calculate brake setpoints (411) determines blue mode (404) is set to PWM and, by default, copies the value (1403) within blue setting (415) to a vbat setpoint (413). Calculate brake outputs (1404) operates as previously described except the brake setting (402) locations for brake current drawn from the blue wire interface (109) now contain values and said brake settings no longer draws current from the trailer battery input (123) which is now set to zero. Control brakes (1405) operates as previously described except the blue wire interface (109) signal is now passed to the brake output (125,126,127,128) hardware where brake actuator current is now being indirectly drawn (1407) from the vehicle battery (120) over the blue wire (108) versus being drawn (1407) from the trailer battery (121). This mode of operation is utilized when a traditional brake controller (202) is installed in tow vehicle and is determined with the blue current (417) exceeds a threshold value.

Monitor blue input (414) captures the peak blue wire voltage and places its value in blue voltage (416) and captures peak current and places it in blue current (417) where if said blue voltage value drops below a pulse width dependent threshold value a fault is generated indicating a marginal wiring connection exists between the brake controller (202) and the brake actuator controller (102). When a peak blue wire voltage fault is detected the brake actuator controller (102) may draw brake output current from the trailer battery input (123) where calculate brake setpoints (411) copies a blue setting (415) value to a tbat setpoint (405) location versus copying it to a vbat setpoint (413) location then providing brake actuator current to one or more brake actuators from the trailer battery input (123) versus from the vehicle battery (120) via a degraded blue wire (108), to attempt to maintain braking forces until the detected wiring fault is corrected.

The sum of the tbat setpoint and the vbat setpoint and any values placed in a sway setting (410), blue setting (415), controller setting (403), vehicle speed (419), wheel setpoint (431) or values derived from an external interface such as a brake switch or a blue setting (415) or any combinations of these variables are collectively referred to as a braking setpoint where a specific implementation may support one or more of these settings and setpoints. Calculate brake outputs (412) determines a brake setting (402) utilizing a braking setpoint and a PID output (432) value where a braking message is defined to be a network message containing a variable that affects the value placed is said brake setting.

In the preferred implementation the brake actuator controller (102) contains a low power blue wire interface (109) supporting; blue wire serial communications, plug mode, breakaway mode, PWM mode and also supports a vehicle network (220) communications interface and where high current PWM operation (1407) is optional.

Blue wire communications utilizes a range of signaling voltages, signaling frequencies, message packet rules commonly referred to as the physical layer. The blue wire binary communications signal voltage levels are: a static voltage (1006) when binary messages are not being sent is a percentage of the vehicle battery voltage (1005) and a high binary voltage level being a greater percentage of said static voltage and a low binary voltage level being a lower percentage of said static voltage where the communication circuits are capable of withstanding applied voltages both when sending and receiving a message that are in excess of the vehicle battery (120) voltage or below ground level. The static voltage (1006) of serial communications when a message is not being sent is different than the plug voltage level (1003) applied to the blue wire interface (109) when operating in LOCAL PWM mode. The blue wire binary communications (1004) supports multiple baud rates where the highest baud rate that maintains reliable communications is selected and as is common in the art a bit duration of a high binary voltage or a low binary voltage is dependent upon the selected baud rate.

A typical operational sequence for purposes of determining the system into which the brake actuator controller (102) is installed is where; a brake controller (202) is off and said brake actuator controller is off, the brake pedal is depressed where pressing the brake pedal applies power to the brake switch wire (106) on the 4 pin connector (124) which wakes up said brake controller, the tow vehicle (103) is started, said brake controller attempts to establish communications with the tow vehicle (103) via the a vehicle network (220) and initiates communications with said brake actuator controller by sending a series of 50% duty cycle pulses (1002) at brake pulse levels except in the communications frequency range (1004) on the blue wire (108) which is then applied to said blue wire interface (109) waking up said brake actuator controller, said brake controller and said brake actuator controller then establishing communications as described below, or said brake controller may establish communications with said brake actuator controller utilizing a trailer network (122) versus utilizing said blue wire interface.

Figure 6:
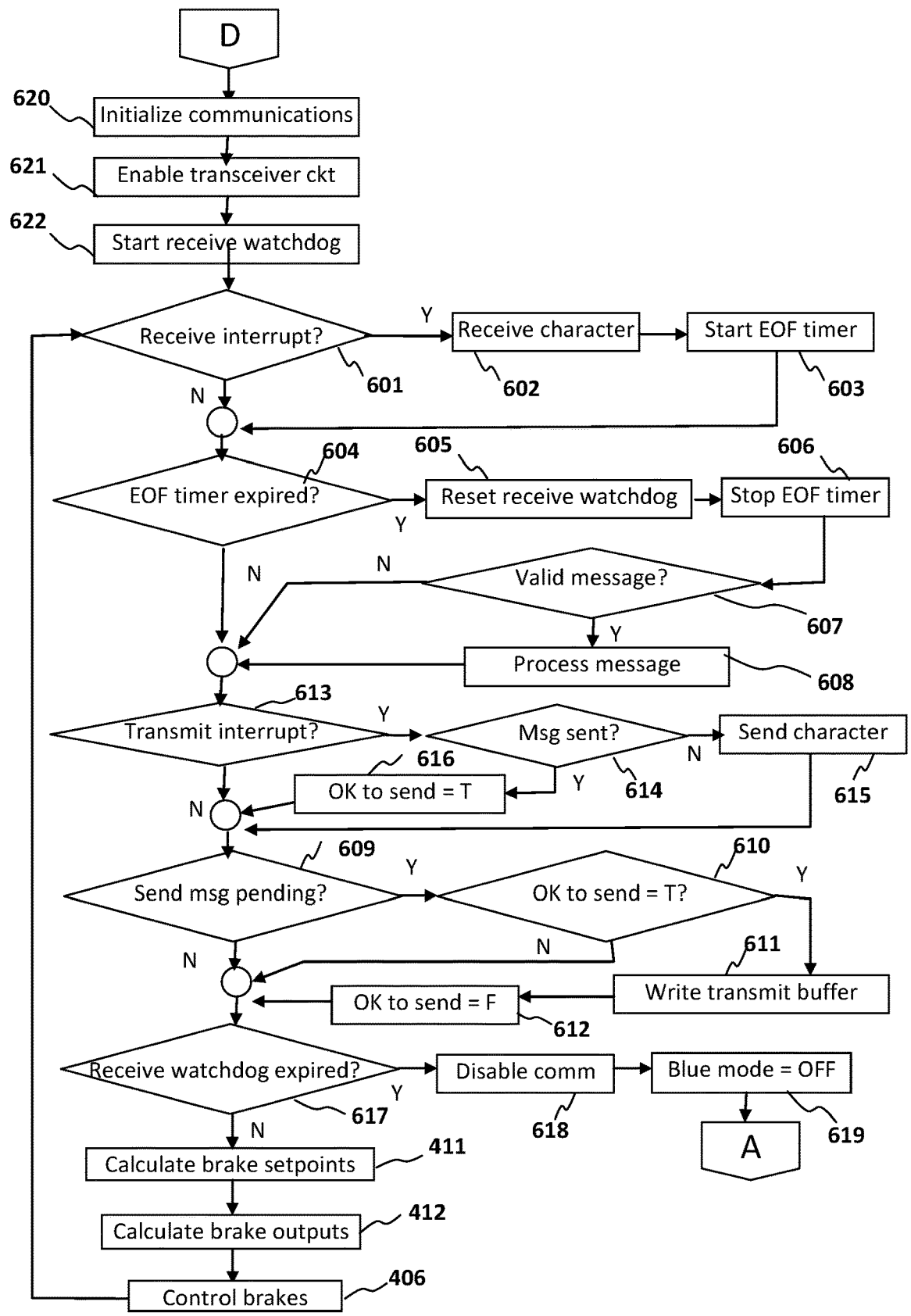
FIG. 6 is a flow chart describing the receiving and sending of serial communication messages utilizing the existing brake wire connection to the brake actuator controller.

FIG. 9 further shows upon waking up the brake actuator controller (102) detects the communications frequency (906) then sets blue mode (404) to a NETWORK TBLUE (907) value. FIG. 6 indicates the blue wire communication is initialized (620), the transceiver circuits are enabled (621), a receive watchdog timer is started (622) and set to a higher duration than when communication is established and in this blue mode (404) said brake actuator controller awaits a valid request message from the brake controller (202). If communications is not established before the receipt watchdog timer expires (617) communications is disabled (613) and blue mode (404) is reset to the OFF state (619).

FIG. 6 further describes activating a blue wire network interface is when one or more bytes are received and hardware circuitry generates a receive interrupt (601) where received byte(s) are moved to a message buffer (602) and an end of frame timer is started (603) and or reset. This continues until the end of frame timer expires (604), indicating the last byte of a message has been received and the end of frame timer is stopped (606). To monitor the health of the sending control device, such as a brake controller (202) and a brake actuator controller (102), a receive watchdog timer is reset (605) where duration is set to an operational value and the received message contents validated (607), and if a valid packet has been received the message is processed (608) often creating and initiating the transmission of a response message. If a send message is pending (609) where a time interval after receiving a message has expired it is OK to send (610) and the first message bytes(s) are written to a transmit buffer (611) and OK to send is set to false (612). When the transmit buffer is empty a transmit interrupt (613) occurs, if all message bytes have not been sent (614) then send character (615) places next byte(s) into transmit buffer. Byte transmission continues until message is sent (614) where after duration of time OK to send is set to true (616) enabling production of additional messages. If the control device producing the message received does not send another message prior to the receive message watchdog timer expiring (617) a network fault is set and the brake actuator controller (102) takes corrective action which may include producing a recovery message to the sending brake controller (202) and or may result in said brake actuator controller disabling communications (618), setting blue mode (404) to the OFF (619) state and awaiting a new signal on the blue wire interface (109) of the same or a different type. A different type of blue wire signal may be received if trailer is disconnected from one tow vehicle and connected to another tow vehicle. Once the brake controller (202) successfully establishes communications with the tow vehicle (103) said brake controller then performs additional dialogs with the brake actuator controller (102) to determine the type of functionality supported by the brake actuator controller (102).

The brake controller (202), upon finding an modulation capable brake actuator controller (102); determines which standardized message numbers are consumed by the brake actuator controller (102) and determines the desired message production interval for the selected standardized message(s). The standardized message number, containing vehicle parameter values, indirectly identifies the parameter identifier values to be retrieved from the tow vehicle (103). The brake controller (202) then determines if the requested parameters are available on the vehicle network (220) available at the diagnostic connector (203) interface. Once the requested vehicle parameters are retrieved from the tow vehicle (100) the brake controller (202) produces a standardized message number at the requested production interval and consumed by the brake actuator controller (102) via the blue wire interface (109).

The brake controller (202) thus monitors critical parameters within the tow vehicle (103) via a vehicle network (220, 221) and produces braking messages then consumed by the brake actuator controller (102) at a blue wire interface (109) or at a trailer network input (122) where when a consumed message is determined to be valid message (607) where process message (608) determines if a braking message has been received which contains one or more braking values, examples of which are; brake PWM value, vehicle speed, the status of the brake switch (106), vehicle acceleration value, vehicle abs status and steering angle values. Process message (608) may place a received PWM value in a controller setting (403) or may determine said controller setting based upon braking message data received. In this configuration the blue wire interface (109) on the trailer (101) is contained within the brake actuator controller (102), but could as easily been contained within another control device and forwarded via the trailer network interface (122). Calculate brake setpoints (411) determines blue mode (404) is set to NETWORK TBLUE value, determines sway setting (410) and blue setting (415) contain a value of zero then retrieves a value within controller setting (403), and places that value in tbat setpoint (403). Calculate brake outputs (412) copies tbat setpoint (403) values into brake setting (402) then control brakes (406) reads a brake setting (402) for a wheel and depending upon the output state (407) applies a braking pulses (401) to each of the respective brake outputs (110,111,112,113) drawing brake actuator current from the trailer battery input (123).

If a sway controller (118) message is received at the trailer network interface (122) where said sway controller message contains left brake output values and right brake output values, consume CAN messages (409) places received values in sway setting (410). Assume blue mode (404) value is set to a NETWORK TBLUE mode, calculate brake setpoints (411) then adds each left brake value and each right brake value from sway setting (410) to the respective controller setting (403) values placing results in a tbat setpoint (405) for each wheel. Since brake current is drawn from the trailer battery input (123) in this configuration, calculate brake outputs (412) reads each tbat setpoint (405) value and sets each brake setting (402). Control brakes (406) then operates as described previously.

Figure 3:
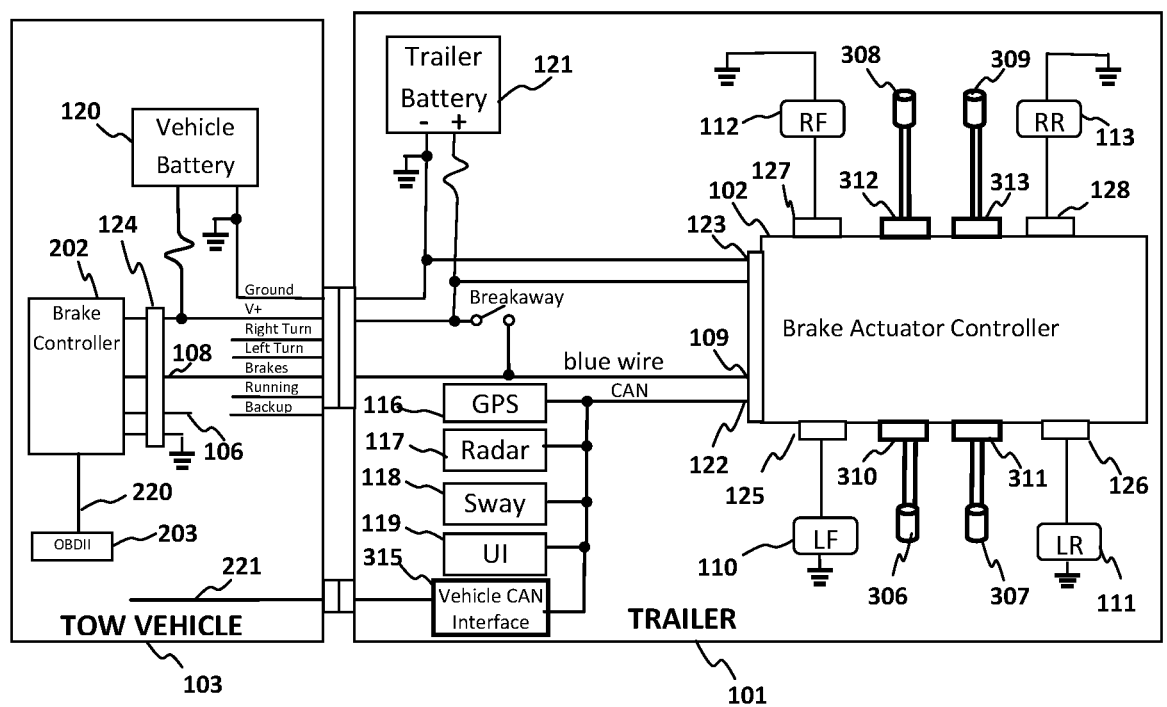
FIG. 3 is a system interconnect wiring diagram of one embodiment utilizing wheel speed sensors and utilizing an in vehicle brake controller or vehicle network data and providing various forms of modulated wheel speed control functionality.

FIG. 3 adds the following to FIG. 1 and or FIG. 2; a plurality of wheel speed sensors (306, 307, 308, and 309) and a plurality of wheel sensor inputs (310, 311, 312, 313) to monitor the wheel sensor signals. Although this invention may utilize wheel speed sensors that contain a multitude of functionality, including determining wheel speed, this invention describes utilizing traditional wheel speed sensors generating pulses when a rotating wheel or tone ring, containing slots, pass the wheel sensor which then generates pulses as slot edges are detected which are applied to wheel sensor inputs (310, 311, 312, 313).

In the preferred implementation the brake controller (202) would be: a user interface module not containing circuitry capable of applying traditional blue wire high current pulses to the brake actuator controller (102) where the user interface utilizing blue wire (108) serial communications to provide said brake actuator controller diagnostic information to the end user, retrieve parameter values from the tow vehicle (103), minimally produce vehicle speed and optionally a braking duty cycle value, provide configuration, monitoring, diagnostic and fault screens relative to the operation of the trailer braking system, provide manual brake control values, support other control devices residing on the trailer network where said brake actuator controller may optionally forward messages between the CAN based trailer network interface (122) and the blue wire network.

Figure 4:
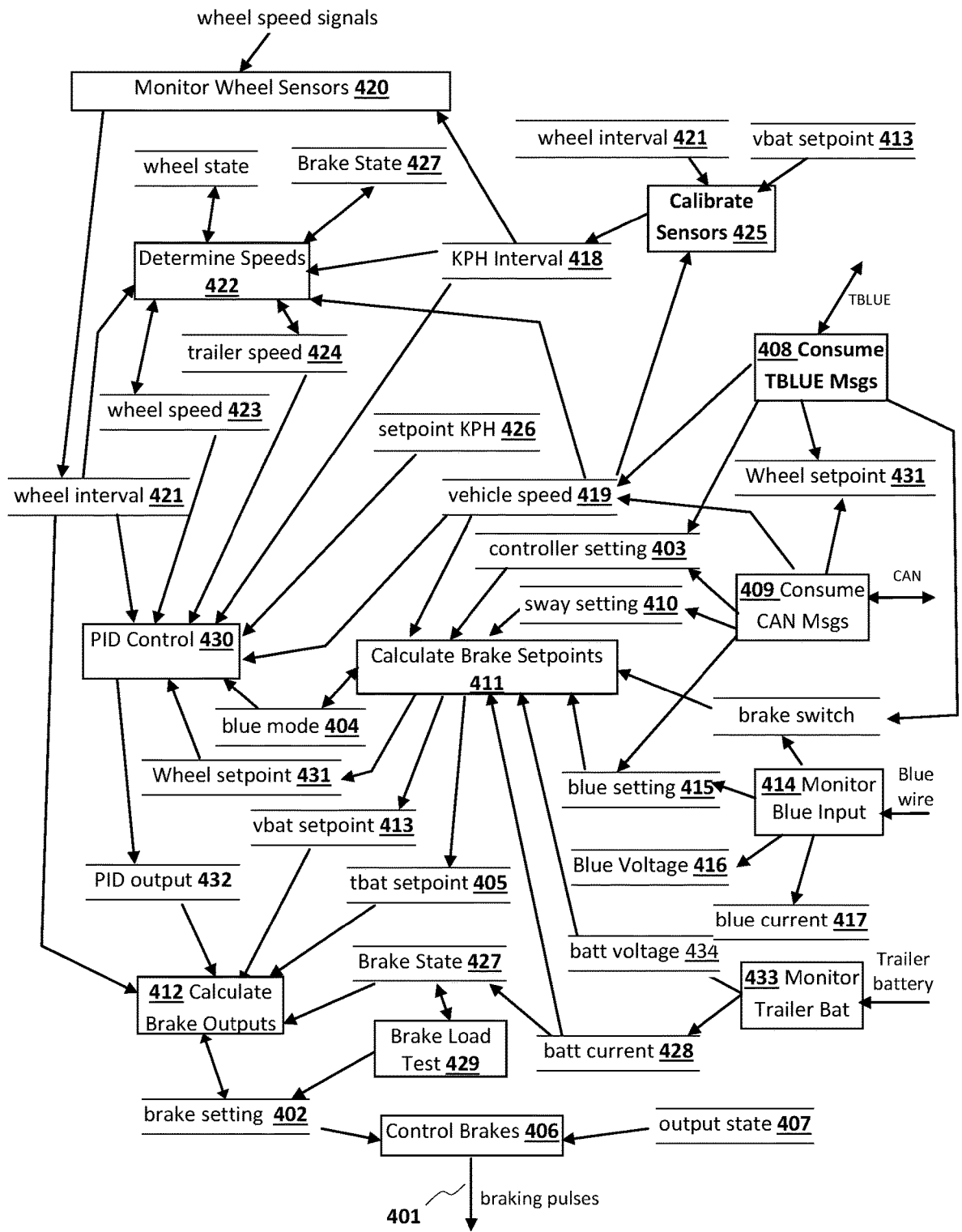
FIG. 4 is a data flow diagram supporting functionality provided by multiple versions of a brake actuator controller.

FIG. 4 is a data flow diagram of a portion of the functionality within the brake actuator controller (102) where the KPH Interval (418) is a 256 entry table containing the pulse width duration of a wheel sensor for each Kilometers Per Hour (KPH) value from 0 to 255 KPH. Although any number of table entries or any engineering unit could be used KPH is utilized for vehicle speed (419) as this is the value utilized within SAE tow vehicle (103) networks and simplifies integration with two vehicles that may control trailer wheel speeds. Monitor wheel sensors (420) captures a pulse width, in cpu clock ticks, of a wheel speed signal pulse generated by a wheel sensor (306,306,308,309) and applied to a wheel sensor input (310,311,312,313) and places each captured value into a wheel interval (421). Determine speeds (422) retrieves the captured wheel interval (421) and compares said wheel interval value to the values within a KPH Interval (418) table where the wheel speed (423) is set to the table offset containing a value closest to, but less than a wheel interval value (802). The default KPH Interval (421) table values contain a wheel interval (421) value for a typical 80 slot tone ring and a selected rolling tire radius, where changes in either value will result in errors in wheel sensor pulse width values versus the actual vehicle speed (419). A KPH Interval (418) table could be replaced with an algorithm. Although the default values within a KPH Interval (418) table may be used; when integrated with a tow vehicle utilizing a network interface optimal performance is achieved by either downloading values into a said KPH Interval table for a specific trailer (101) configuration or calibrating said KPH Interval table for the trailer (101) onto which the brake actuator controller (102) is installed. System diagnostics and fault tolerance operations are simplified when the estimated trailer speed (424) value and wheel speed (423) values closely matches speed values received from other control devices within the system, such as a vehicle speed (419) value received at either the blue wire interface (109) or a trailer network interface (122).

Figure 7:
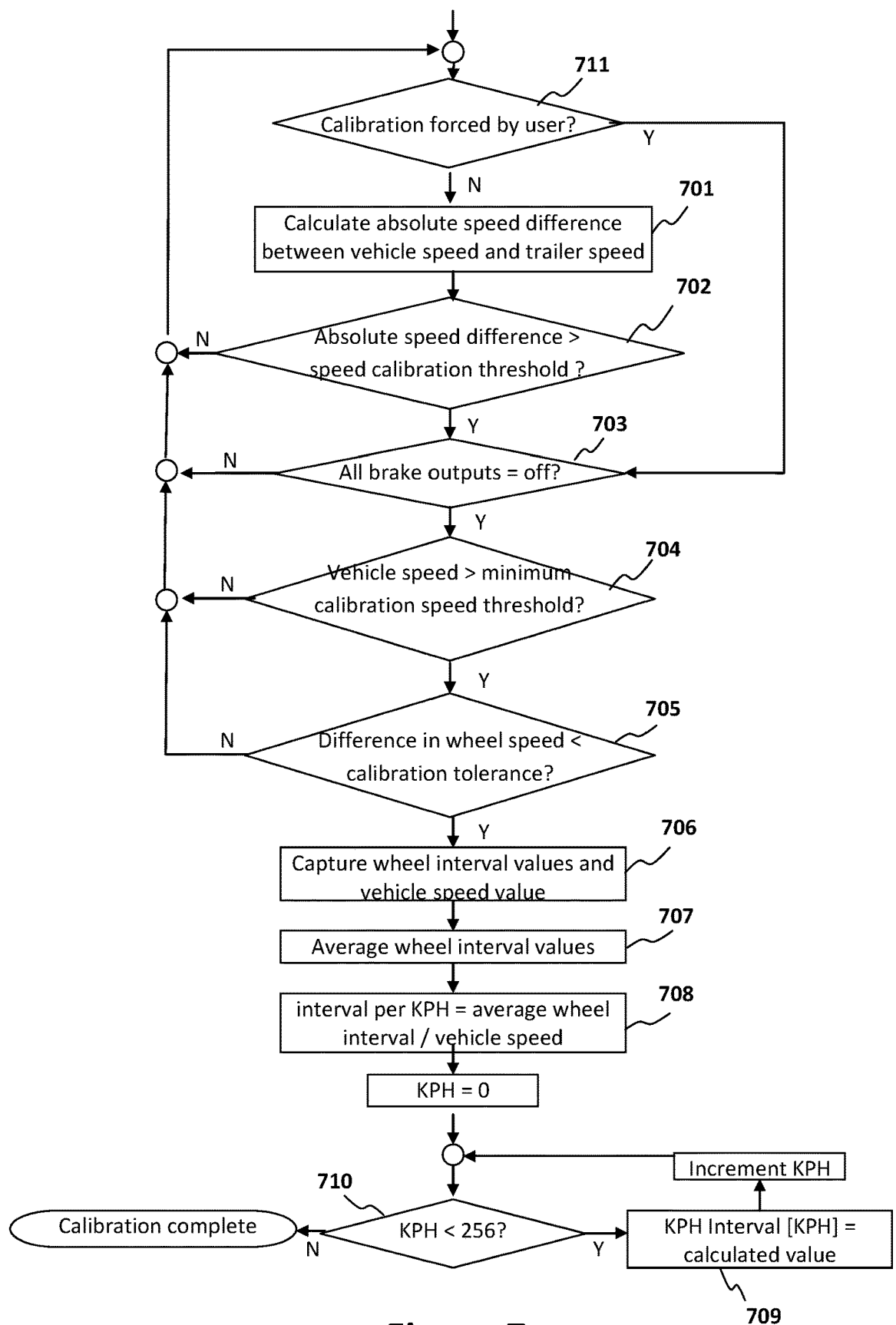
FIG. 7 is a flow chart describing the synchronization of a vehicle speed to a trailer speed when vehicle speed is available from a network interface.

FIG. 7 is a flow chart describing the calibration of wheel sensor (306, 307,308, 309) pulses so that a derived wheel speed (423) value matches the received vehicle speed (419) where calibration is either; manually initiated by user (711) via a user interface device or initiated automatically when a vehicle speed (423) value is consumed by brake actuator controller (102) within a braking message at the blue wire interface (109). The absolute difference between the wheel speed (423) and a vehicle speed (419) is calculated (701) and if difference exceeds a speed calibration threshold value (702) then calibration may be initiated. Additional calibration preconditions checked prior to calibration of the KPH Interval (418) table values include verifying: each brake output (125, 126, 127,128) is off (703); the actual tow vehicle speed (419) exceeds a minimum calibration speed threshold (704); and the wheel speed (423) of the fastest wheel minus the wheel speed (423) of the slowest wheel is less than a calibration tolerance value (705); then calibrate sensors (425) captures the received vehicle speed (419) value and wheel interval (421) values near the same point in time (706); averages said wheel interval values captured (707); divides the average wheel interval (421) value by said vehicle speed value to determine pulse time value, in clock ticks, per KPH (708) value and then; utilizes said pulse time value to populate the KPH Interval (418) table entries (709)

with each calculated value, in clock ticks, for each vehicle speed value from 0 to 255 KPH. Once calibration is complete the captured wheel interval (421) values will result in the trailer speed (424) value matching, or nearly matching, a vehicle speed (419) value.

When the brake actuator controller (102) derives trailer speed (424) value using the wheel interval (421) values (1106) the modulated braking system is operating in standalone mode and if vehicle speed (419) is received from a network (1107) and said vehicle speed value is then copied to the trailer speed (424) then modulated braking system is operating in a network mode.

As integration of trailer braking with a tow vehicle evolves this invention allows a tow vehicle to provide wheel speed setpoints for a wheel where this invention attempts to maintain a wheel speed at a wheel speed setpoint. This functionality is also provided to maintain a wheel speed (423) below a trailer speed (424) where releasing a wheel is only required when modulated braking is operating in standalone mode or when instructed to do so via a braking message or when estimating said trailer speed requires an periodic release of a plurality of wheel speeds to determine the actual said trailer speed. This invention minimizes wheel releases to provide the shortest stopping distances while not flat spotting a tire and while maintaining wheel rotation, generating tire heat, and thus providing optimal traction during normal dry road braking conditions. This invention thus utilizes various methods of maintaining a wheel speed, but primarily a form of Proportional Integral Derivative control (PID control) is used, where the simplest form being proportional control. Whether the wheel setpoint (431) is received from a network interface (109,122), retrieved from a setpoint KPH (426) table based upon the trailer speed (424) value, or by default set to said trailer speed the operation of PID control (430) is the same.

The magnitude of the braking forces can be changed by varying a proportional gain value when only proportional control is used, but since proportional control cannot maintain a wheel speed (423) equal to a wheel setpoint (431) value under changing road conditions integral control is optionally enabled (1108) and since a rapid response to rapid changes in said wheel speed and or wheel acceleration is desired derivative control (1104) is optionally enabled.

PID control (430) determines a proportional error by subtracting a wheel speed value (1101) from a wheel setpoint (431) value, a proportional output (432) value is determined by multiplying the proportional error times a proportional gain (1102) value where said wheel setpoint value is dependent upon the abs mode where the default standalone mode (1116) of operation sets said wheel setpoint to trailer speed (1106).

When integral gain is greater than zero integral control is enabled (1108) where PID control (430) determines integral contribution at a time interval where the duration of the time interval between calculations may be reduced to increase the rate at which the integral contribution is calculated and where said duration is increased to reduce the rate at which the integral contribution is determined, where when said time interval expires and when a wheel speed (423) value is below a wheel setpoint (431) value a proportional error is added to a integral value and when a said wheel speed is above a said wheel setpoint a proportional error is subtracted from said integral value and when integral value is updated (1103) said integral value is multiplied by a integral gain value to determine a integral contribution.

Derivative control requires a wheel acceleration value where acceleration is determined by capturing a wheel interval (421) over an interval of time where the change in said wheel interval value and said interval of time between captures determines a wheel acceleration value, where if the duration of time between wheel sensor (306,307,308,309) pulses exceeds a time interval threshold value a watchdog timer expires and said wheel acceleration value is set to zero. Relative to PID control (430) calculations wheel acceleration may be positive or negative and for clarity, relative to determining the state of a wheel, the terms wheel acceleration is an increase in wheel speed and wheel deceleration is a decrease in wheel speed.

When derivative gain is greater than zero derivative control is enabled (1109) where PID control (430) updates derivative value at a time interval where a derivative contribution is determined by multiplying a wheel acceleration value times a derivative gain value.

A PID output ( ) value is determined by setting a PID output value to a proportional output value; if a wheel is decelerating (1307) a derivative contribution value is subtracted from said PID output value, if a wheel is accelerating (1308) a derivative contribution is added to said PID output value, if a wheel speed (423) exceeds a wheel setpoint (431) a integral contribution value is subtracted from said PID output value and if said wheel speed value is below said wheel setpoint a integral contribution value is added to said PID output.

Calculate brake outputs (412) operates as previously described for non modulating braking systems except when calculating a brake setting value a PID output (432) value is subtracted from a vbat setpoint (413) or is subtracted from a tbat setpoint (405) value to determine a brake setting.

When modulated braking is operating in the standalone mode a wheel setpoint (431) may be retrieved from a setpoint KPH table (1110) where by default table values set said wheel setpoint to the trailer speed (1106) or may be received from another source, primarily the tow vehicle (103) via a supported network (1107) interface (109,122). A setpoint KPH (426) table also contains a desired wheel setpoint (431) value to be maintained by the brake actuator controller (102) for trailer speeds from 0 to 255 KPH, where values within said setpoint KPH vary based upon said trailer speed where the table values may be customized for a specific trailer (101) onto which said brake actuator controller is installed. Multiple setpoint KPH (426) tables may be provided for various reasons, including varying levels of braking aggressiveness or for varying road conditions. In standalone mode the estimated trailer speed (424) value, in KPH, is used as the offset into a setpoint KPH (426) table to retrieve a wheel setpoint (431) value. For example: Assume the trailer speed (424) is 40 KPH and assume located at entry offset 40 into a setpoint KPH (426) table a value of 30 KPH is retrieved then said value is then placed in a wheel setpoint (431). When modulated braking is operating where blue mode (404) is set to a network mode and where a consumed message contains a controller setting (403) and where a wheel setpoint (431) is set to a value received (1107) from a supported network and thus setpoint KPH ( ) table is not utilized.

The brake actuator controller (102) provides various modes of operation of a modulating braking system where abs mode may be set to a; ABS RELEASE value, a MAINTAIN SPEED value when wheel setpoint (431) is set to the trailer speed (424), MAINTAIN LOCAL SPEED when said wheel setpoint is set to a value other than said trailer speed such as retrieving a value from a setpoint KPH (426) table, and MAINTAIN NETWORK SPEED when said wheel setpoint is received within a network message received from a supported network (109,122). A description of the ABS RELEASE mode is provided as it is the market standard and an expected behavior. The MAINTAIN SPEED mode and various forms of this mode of operation are provided to facilitate improved braking and when integrated with a tow vehicles braking system and or with sway control systems.

Determining trailer speed (424) from wheel speed (423) when brakes are not applied can be as simple as an average of the wheel interval (421) values, where said average wheel interval is compared to values in KPH Interval (418) table to determine said trailer speed. When a maximum brake setting value is applied where when brake pedal is first pushed, as on ice, a wheel speed (423) will almost immediately not match trailer speed (424) where estimating said trailer speed requires a wheel release to capture the current trailer speed (1304). This invention utilizes a wheel interval (421) when a wheel is released to periodically set the estimated trailer speed (424) and where the change in a said wheel interval between releases of said wheel interval is captured and the duration of time between releases of wheel captures determines the rate at when the said estimated said wheel speed is reduced between released said wheel interval captures. This invention may receive velocity value from a supported network interface (109,122) from another control device and then set the trailer speed (424) to the received value, or when a network velocity value is not available shall derive said trailer speed from wheel interval (421) values.

Determine speeds (422) reads a wheel state and then determines, and optionally changes, a brake state (427) where said brake state values include but are not limited to; shorted on, disabled, open, forced on, forced off, on and off. If the brake actuator controller (102) supports modulated operation and if a brake state (427) is set to either disabled or forced off (801) the wheel speed (423) of the respective wheel shall set (802) the trailer speed (424). Determine speeds (422) shall set the wheel state to IDLE when brakes are not applied and thus a plurality of wheel interval (421) values is used to determine the trailer speed (424) value. If the brakes are active the wheel state is set to either; modulating (827), released (806), released accel (813), released coasting or released decel (818).

To avoid confusion utilizing positive and negative acceleration values in determining a state of a wheel this description defines acceleration as an increasing speed and deceleration as a decreasing speed, where a wheel interval (421) value is captured at an interval of time and where a wheel acceleration value (reduction in a wheel interval) is determined by subtracting a second said wheel interval from a first said wheel interval, a wheel deceleration value (increase in a wheel interval) is determined by subtracting a first said wheel interval from a second said wheel interval, and constant wheel speed (423) is when a change in said wheel interval value is less than an acceleration threshold value or a deceleration threshold value.

Figure 8:
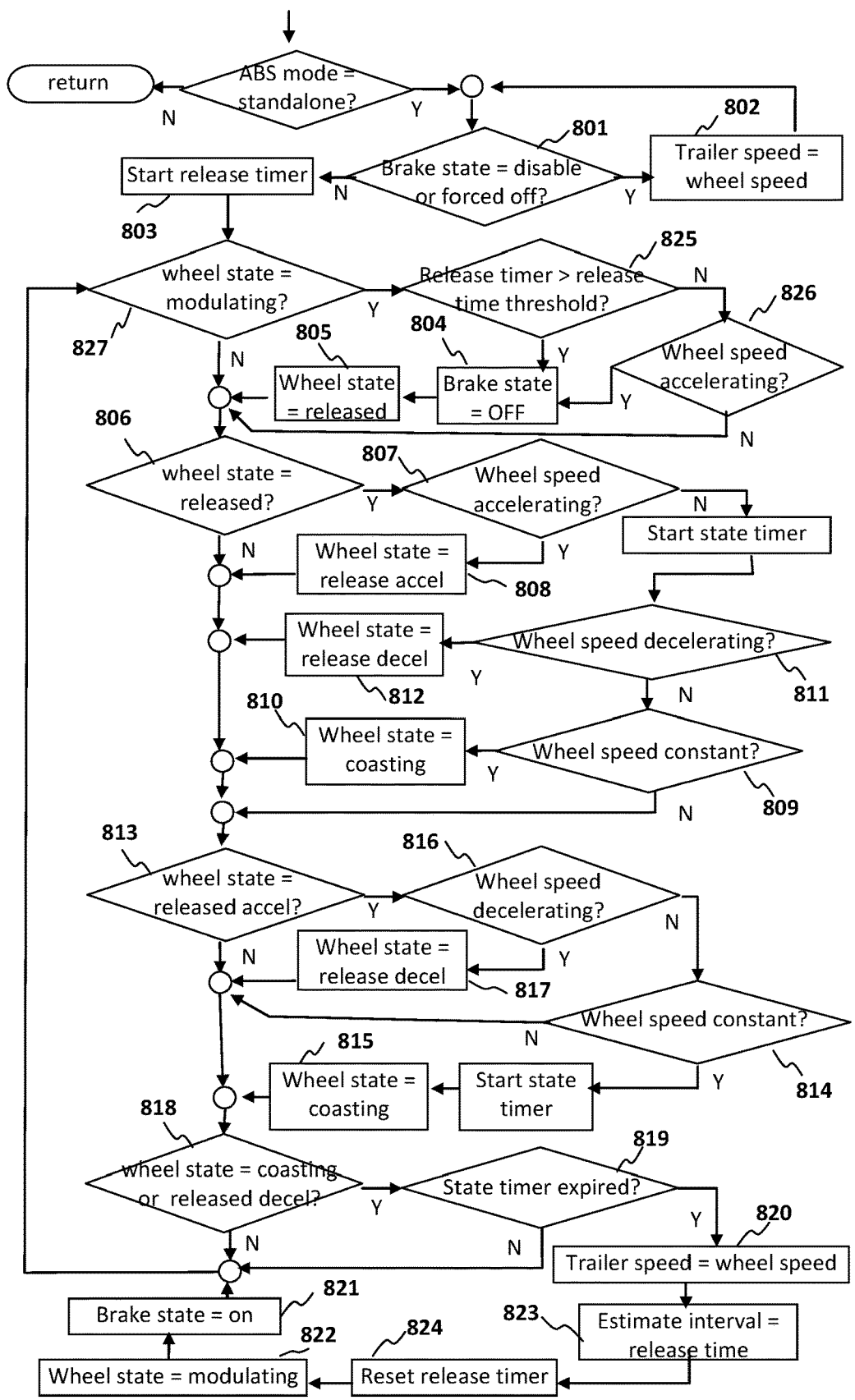
FIG. 8 is a flow chart describing how the state of a braking wheel is determined and the usage of said brake state in determining trailer speed.

FIG. 8 describes an ABS RELEASE mode to where the state of a wheel is determined where various state transitions determine when a wheel is at the actual trailer speed (424) and when a wheel interval (421) value is captured and then the captured said wheel interval is used to estimate said trailer speed value. The duration of time between wheel releases (1305,1306) and the change in wheel interval (421) is used to determine the deceleration rate (1307) which is then used, on a timed interval, to update the estimated trailer speed (424) value. Although not shown in flow chart a wheel may always be in the modulating state when brakes are not being pushed or may be placed in the modulating state when brakes are applied.

FIG. 8 indicates a scenario where wheel is in modulating state when brakes are not applied and where upon entry a release timer is initially activated (803), and when said release timer exceeds a time threshold (825) a wheel brake state (427) is set to off (804) and the respective wheel state is set to released (805). The more likely method of exiting the modulating state is where the wheel deceleration (1307) drops below a threshold value (826) as the PID output (432) increases and thus the brake setting (402) drops and thus the wheel stops decelerating and begins to accelerate (1308) and if operating in an abs release mode (1115) the proportional gain is set to an acceleration gain value (1113), thus a wheel brake state (427) may optionally be set to off (804) as the wheel speed approaches the trailer speed (424) and the respective wheel state optionally set to released (805).

When a wheel state is equal to released (806); if a wheel speed (423) is accelerating (807) its wheel state is set to a released accel (808) value; if said wheel speed remains constant (809) for a period of time said wheel state is set to released coasting (810); and if wheel speed is decelerating (811) said wheel state remains in released decel (812).

When a wheel state is equal to released accel (813) value; if wheel speed remains constant (814) for a period of time said wheel state is set to released coasting (815); and if wheel speed decreases (816) said wheel state is set to released decel (817).

When a wheel state is equal to either released coasting state or released decel (818) state or if exceeding an up to speed period of time (819): the estimated trailer speed (424) is set to the released wheel speed (820) and if operating in abs release mode (1115) the proportional gain is set to an decel gain (1114); the respective brake state (427) is set to on (821); said wheel state is set to modulating (822); the a release timer value is captured (823); and the release timer is reset (824).

To estimate trailer deceleration the change in time between a first released wheel interval (421) capture and the second said released wheel interval capture is contained within a release timer and the difference between the said second wheel interval value and said first wheel interval capture are used to determine the trailer deceleration rate, where the estimated trailer speed is then updated at a fixed time interval to estimate the current trailer speed (424) until the next released wheel interval capture occurs.

Various methods may be utilized to select the wheel release rate when all wheels are skidding where the default behavior releases a brake for a period of time sufficient achieved an up to speed indication if a release has not occurred within a release interval. Delaying releasing of a wheel in this invention is not extremely critical as a brake setting (402) modulates as a wheel speed drops below a prior wheel setpoint (431) and thus a fully applied brake setting is constantly reduced where derivative contribution quickly reduces brake setting in slippery conditions. When abs mode is operating in network mode the method used for intermittent wheel release may be selected, where default configuration is release after a period of time if coasting or accel may not occur.

If while operating in NETWORK TBLUE mode the vehicle KPH value received from the tow vehicle network (220) at the brake controller (202) and then received at the brake actuator controller (102) is not received within a message timeout interval said brake actuator controller will switch to standalone mode until a valid vehicle speed (419) value is received.

Multiple devices and various communications media may provide a vehicle speed (419) value and other values utilized by the brake actuator controller (102): including but not limited to the being received from a CAN trailer network (122) or at the blue wire interface (109) the value being sent from any velocity generating device to include but not be limited to: the brake controller (202), a trailer mounted GPS (316) sensor, trailer mounted radar (117) and or a collision avoidance system.

The maximum amount of power applied to a brake output (124,126,127,128) of a brake actuator controller (102) is dependent upon two criteria; the desired longitudinal braking force to reduce a trailer (101) forward velocity and the desired tangential force to eliminate trailer sway. Depending upon the mode of operation of the brake actuator controller (102) values that affect the longitudinal velocity are; placed in blue setting (415) when in the PWM mode or; placed in a controller setting (403) for the LOCAL PWM, NETWORK TBLUE and NETWORK CAN modes. The tangential force reducing values are either; determined within the brake actuator controller (102) or; received from a network interface (109,122) and placed in a sway setting (410). Values that reduce a brake setting (402) value are contained in PID output (431). Calculate brake setpoints (411) determines when values contained within either; a controller setting (403), a blue setting (415), a sway setting (410) or PID output (431) are greater than zero; then depending upon the operating mode: the maximum values for trailer battery (121) wire sourced current is determined and placed within tbat setpoint (405) and; of blue wire sourced current are placed in vbat setpoint (413).

For clarity assume: no faults exist; no brake forces need to be reduced as each wheel speed (423) value is above a wheel setpoint (431), a blue setting (415) value is at 50% and when brake actuator controller (102) is operating in PWM mode; a sway setting (410) for the left brakes is 20% and said sway setting for the right brakes is 0%. The resulting vbat setpoint (413) for one or more left brakes and one or more right brakes are set to 50%, the tbat setpoint (405) for one or more left brakes is set to 20% and right brakes are set to 0%. In another scenario if a controller setting (403) value is 50%, the blue setting (415) is 0% then: operating mode is network mode; a vbat setpoint (413) value is set to 0%; a said tbat setpoint for one or more left brakes is set to 70% and; the said tbat setpoint for one or more right brakes is set to 50%.

Most brake controllers (202) apply one or more diagnostic pulses to the trailer actuators (110,111,112,113) to perform two basic trailer brake diagnostics; short circuit detection and open circuit detection, where two or more brake loads is generally considered operational brakes where a connected indication is provided to the user, thus a six brake system may be operating with as few as two brakes. In this invention the brake actuator controller (102) monitors brake current sources where measurements are contained in batt current (428) for trailer battery (121) wire and blue current (417) for blue wire signals applied to the blue wire interface (109), and if a short circuit current is detected a brake load test (429) is initiated where: brake setting (402) values for shorted current source are disabled; a said brake setting value for first brake is set to a test value; if a short is detected the respective brake state (427) is set to a shorted, if an open circuit exists said brake state is set to open circuit, and if no fault is detected said brake state is set to enabled; then the first said brake setting value is set to zero; the second said brake setting value is set to a test value and the test repeats on second brake, where the process continues until all remaining brakes are tested. If a brake state (427) is shorted control brakes (406) will not activate the respective brake.

This invention provides a brake hardware test where in the preferred implementation one brake output is activated at a time, where a brake setting (402) value is increased until a wheel interval (421) value exceeds a brake test interval threshold value at which time said brake setting value is captured. If maximum available brake setting (402) value is applied and a wheel interval (421) value does exceed the brake test interval threshold a fault is indicated. Representations of each captured brake setting (402) value at test interval threshold are provided to the user, where high variances between said brake setting values between wheels, or where an excessive said brake setting value was required to reach said brake test threshold value is an indication that brake service may be required. Mechanical brake mechanisms, shoes, pads and so forth either need to be adjusted or replaced when acceptable brake test results are not achieved on each wheel. Although all brakes could be tested at the same time in the preferred implementation application of brakes one at a time minimizes weight shifting between axles and thus provides a better indication of the relative operation of each brake.

Figure 12:
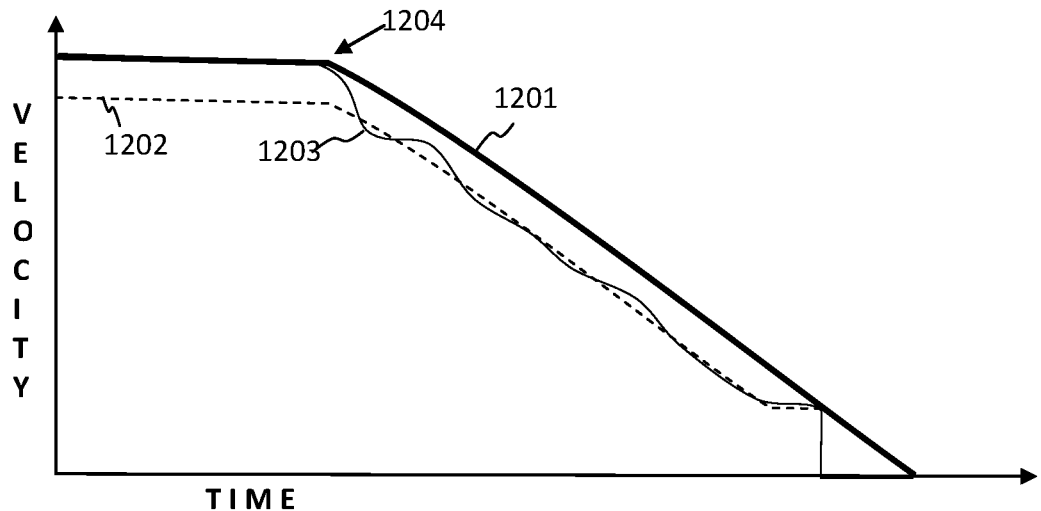
FIG. 12 is a diagram of a wheel speed versus a vehicle speed when receiving vehicle speed from the tow trailer and maintaining a wheel speed at a wheel speed setpoint either determined within a brake actuator controller or provided from the tow vehicle over a supported network.

FIG. 12 indicates the preferred implementation, utilizing a vehicle KPH value received in a network message (109, 122) from the tow vehicle (103) where vehicle KPH is represented by the thick black line (1201). The dashed line (1202) represents a wheel setpoint (431) value which is either retrieved from a setpoint KPH (426) table within the brake actuator controller (102) determined utilizing the vehicle speed (419) or may be received in a network message from tow vehicle (103). While operating in a maintained speed mode the actual wheel speed (1203) modulates braking pulses (401) to maintain a wheel speed (423) value at a wheel setpoint (431) value. When operating in maintained speed mode (1112) and when utilizing a vehicle KPH (1201) value as the trailer speed (424) a PID control (430) has its gain values adjusted for a minimal wheel speed (424) overshoot (1203) when brakes are first applied (1204). The various PID control (430) gains may change once a wheel setpoint (1202) value is achieved where said wheel setpoint value may change based upon various braking scenarios where maximum deceleration rate is initiated. The maintained speed mode of operation is provided to facilitate reduced braking distances as well as provide dynamic adjustments a wheel speed (423) for both longitudinal braking as well as sway reduction and preemptive brake application for integrated collision avoidance systems including when rapid changes in steering angle occur at high vehicle speeds and before a sway event is detected as well as providing traction conditions detected by tow vehicle. The desired maintained wheel speed (1202) mode is selected to provide optimal deceleration where selected wheel setpoint (431) may be equal to or relatively close to the trailer speed.

Figure 13:
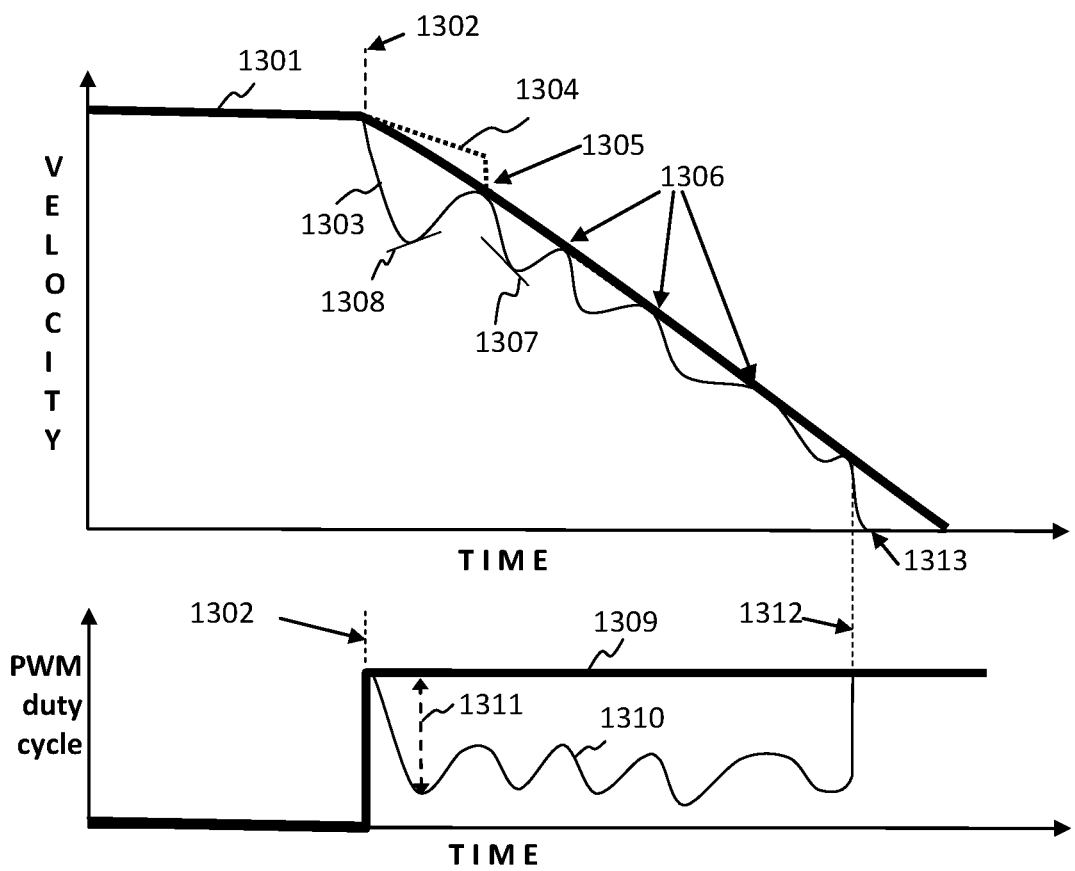
FIG. 13 is a diagram of a wheel speed versus a vehicle speed when operating similar to a traditional antilock brake controller.
Figure 14:
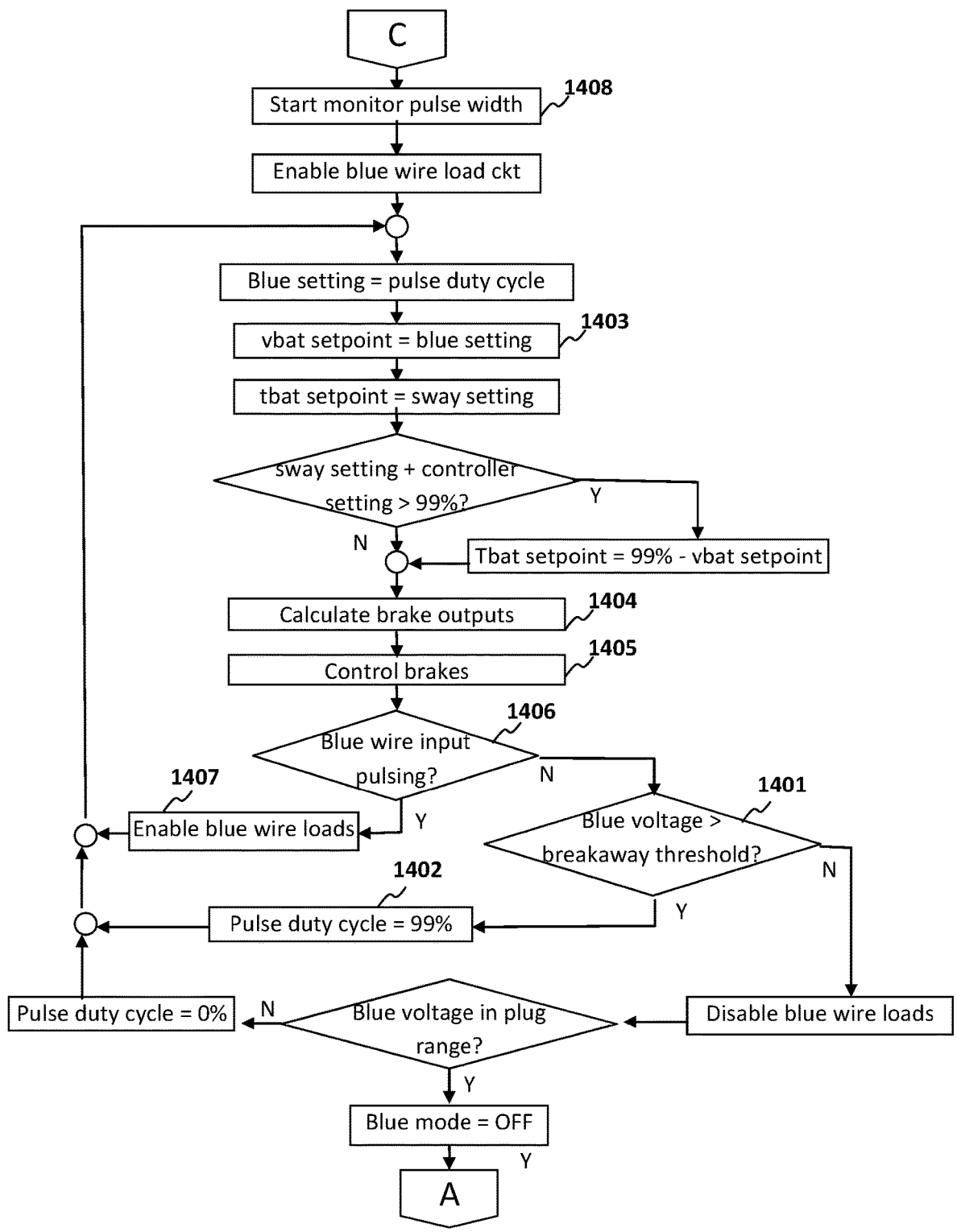
FIG. 14 is a flow chart describing the basic behavior when in a PMW mode of operation.

FIG. 13 is one braking scenario showing two related sets of plots, the upper timeline for a wheel speed (423) and trailer speed (424) and the lower timeline for the magnitude of the applied brake setting (402) value when operating in a traditional ABS release mode, where the short dashed line (1304) represents estimated trailer speed (424) value, where a thin line (1303) represents a wheel speed (423), where the point in time when heavy braking setpoint, shown by a thick line (1309), is initially applied (1302) and where all wheels (one shown) rapidly decelerate where the initial trailer deceleration rate is unknown where a reduced wheel speed (423) representing the trailer speed (424) is not captured until the first wheel release where a released wheel is determined to be up to speed (1305) when transitioning from acceleration to deceleration and at that time a estimated trailer speed (424) is set to the respective wheel speed (419) and a first trailer deceleration slope is determined. In FIG. 13 the brake setpoint applied to the brake actuator controller (102) is shown by a thick line (1309) which is immediately reduced by a PID output (432) value, with PID value indicated at one point in time by a thin dashed line (1311), and where the resulting duty cycle is contained in a brake setting (402) and the applied braking pulses value is shown by a thin line (1310) which is applied to a brake actuator and when the trailer speed (424) drops below an abs off threshold value the full brake setpoint is applied the brakes will lock up (1313).

This invention utilizes a combination of fastest wheel values and each of a plurality of wheel speed (419) values when a wheel is released (1305, 1306) to determine trailer deceleration rates and thus estimate trailer speed (424) when brake actuator controller (102) is operation in a standalone mode. This invention utilizes or a brake applied timeout duration threshold value to change a PID gain value of a wheel if a deceleration rate threshold value (1307) is not achieved within said duration. Although this invention describes utilizing PID control (430) relative to controlling the wheel speed (423) a said PID control may also be utilized where a sway control value, such as tangential velocity, tangential acceleration or more simply stated changes is sway angle over time is the PID process variable applied to a said PID control (430) and where a PID output (432) is added to other values to determine a brake setting (402) indicated by a thin line (1310) and optionally subtracted from other values when the difference between left sway setting and right sway setting are no longer maintained at a brake setting (402) for left brakes and for right brakes. Unlike traditional uses of PID control (432) this invention utilizes a PID output (432) value which is subtracted from a braking setpoint value to reduce braking forces when trailer braking is applied.

Invention enables a version A brake actuator controller (102) to receive at a blue wire interface (109) an on or off signal such as LOCAL PWM mode representing an activation of the tow vehicle brakes traditionally derived from a brake switch or a brake light and where a braking algorithm, such as timed based braking, determines a controller setting which then results in the application of trailer brakes (110, 111,112,113) drawing power from a trailer battery input (123) as described within this invention. The version of a brake actuator controller must utilize the trailer battery input (123) as the source of power for the brake actuators and optionally may not be capable of drawing current from the blue wire interface (109) although it would then not be compatible with many existing brake controllers.

A plurality of wheel speed sensors (306,307,308,309) may be added to version A creating a version B where a trailer deceleration rate is derived from a said plurality of wheel speed sensors and where said deceleration rate then generates a controller setting (403) which then results in the application of trailer brakes (110,111,112,113) drawing power from a trailer battery input (123) as described within this invention. If a version B did not support plug mode or sway control it could solely provide power to brake actuators from the blue wire input (109) and thus provide modulating brake functionality.

A network interface (109,122) to tow vehicle (103) is added to version A to create a version C or added to a version B to create a version D where said network interface provides a braking message and where a brake actuator controller (102) which then determines vehicle deceleration and generates a controller setting (403) which then results in the application of trailer brakes (110,111,112,113) drawing power from a trailer battery input (123) as described within this invention.

A further integration with version C or a version D where a tow vehicle (103) provides a braking message containing variables which affect a wheel speed (423), such as containing a wheel setpoint (431), and where brake actuator controller (102) then operates as described within this invention.

Multiple combinations of functionality within this invention are possible where a preferred version would not power brake actuators from the blue wire input (109) but would support all blue wire signal types and would solely power brake actuators from the trailer battery input (123).

What is claimed:

1. A method of braking a trailer with a trailer braking system, the method comprising: measuring, at a brake actuator controller (102), voltage applied to a blue wire interface (109) from a vehicle (103) to apply the trailer braking system; determining voltage applied to a blue wire interface exceeds a breakaway threshold (1401) and setting a controller setting (403) to a maximum value (1402); determining voltage applied to a blue wire interface (102) is within a plug range (901) and then generating varying (508) controller setting (403) values; measuring, at a brake actuator controller (102), pulse durations and pulse intervals (1408) of a PWM signal (1002) applied to a blue wire interface (109); determining a duty cycle of PWM signal (1002) applied (1406) to a blue wire interface (109) and then generating a blue setting (415) to a value representing said duty cycle; calculating brake setpoints and then calculating brake outputs (412) to determine a brake setting (402); and controlling brakes (406) by generating braking pulses (401) at a brake setting (402) to a brake output (125,126,127,128) to apply a braking force on one of a plurality of wheels.

2. The method of braking the trailer according to claim 1, the method further comprising: receiving, at a brake actuator controller (102), a braking setpoint from a vehicle (103) to apply the trailer braking system; receiving, at the brake actuator controller (102), a plurality of wheel speed signals from a plurality of wheel speed sensors (306,307,308,309); determining a wheel speed (423) of one of a plurality of wheels based on one of the plurality of wheel speed signals; determining trailer speed (424) based on a plurality of wheel speed signals; determining a proportional error (1103) by subtracting a wheel speed (423) from a wheel setpoint (431); determining a proportional output (1102) by multiplying a proportional error times a gain value; determining a brake setting (402) by subtracting a proportional output value from a braking setpoint value; and controlling brakes (406) by generating braking pulses (401) at a brake setting (402) to a brake output (125,126,127,128) to modulate a braking force on one of the plurality of wheels.

3. The method of braking the trailer according to claim 1, the method further comprising: measuring, at a brake actuator controller (102) and a control device (202), a pulse frequency (1002) applied to a blue wire interface; receiving, at a brake actuator controller (102) and a control device (202), binary messages (1004) applied to a blue wire interface (109) wherein said binary message having a high voltage threshold and a low voltage threshold relative to a static voltage level (1006) between said high voltage threshold and said low voltage threshold where said threshold values and said static voltage level are each a different percentage of a vehicle battery voltage (1005), and detecting said thresholds receiving communication signals; sending, from a brake actuator controller (102) and a control device (202), binary messages (1004) applied to a blue wire interface (109) wherein said binary message having a high voltage threshold and a low voltage threshold relative to a static voltage level between said high voltage threshold and said low voltage threshold where said threshold values and said static voltage level are each a different percentage of a vehicle battery voltage (1005), and generating said thresholds for sending communication signals: determining a pulse frequency (1002) applied to a blue wire interface (109) is within a communications range (906) and then initializing serial communications (620) which then applies said static voltage level (1006) to the blue wire interface (109); receiving at a blue wire interface (109) a binary message comprising a plurality of detectable high voltages and low voltages each maintained for a predetermined bit time, said high voltages exceeding said static voltage and said low voltages less than said static voltage; transmitting at a blue wire interface a binary message comprising a plurality of detectable high voltages and low voltages each maintained for a predetermined bit time, said high voltages exceeding said static voltage and said low voltages less than said static voltage; receiving, at a brake actuator controller (102) or a control device (202), a serial communications message applied to a blue wire interface (109) from a vehicle (102) to apply the trailer braking system; determining a valid message is received (607) at a blue wire interface (109) then processing message (608) determining if a braking message has been received and calculating a braking setpoint (411) utilizing received braking message values; determining a brake setting (402) by calculating brake (406) outputs; controlling brakes (406) by generating braking pulses (401) at a brake setting (402) to a brake output to apply a braking force on each of the plurality of wheels; and detecting at a blue wire interface (109) when either said static voltage (1006) is below said low voltage threshold exceeding a time duration or when said static voltage level exceeds said high voltage threshold exceeding a time duration or when a binary message is not received within a watchdog timeout interval (617) and then disabling serial communications (618).

4. The method of braking the trailer according to claim 2, the method further comprising: determining a wheel acceleration value, either positive or negative, based on a plurality of wheel speed signals; determining a derivative contribution (1104) utilizing a wheel acceleration value; determining a pid output value including a derivative contribution; determining a brake setting (402) by subtracting a pid output value from a braking setpoint value; and controlling brakes (406) by generating braking pulses (401) at a brake setting (402) to a brake output to modulate a braking force on one of the plurality of wheels.

5. The method of braking the trailer according to claim 2, the method further comprising: determining an integral contribution (1103) based upon a plurality of wheel speed signals; determining a pid output value including a integral contribution; determining a brake setting (402) by subtracting a pid output value from a braking setpoint value; and controlling brakes (406) by generating braking pulses (401) at a brake setting (402) to a brake output to modulate a braking force on one of the plurality of wheels.

6. The method of braking the trailer according to claim 2, the method further comprising: determining a wheel acceleration value, either positive or negative, based on a plurality of wheel speed signals; determining when a wheel deceleration exceeds a deceleration threshold value (811) to determine when a wheel is decelerating; determining when a wheel is decelerating and a wheel deceleration value drops below a deceleration threshold value to determine when a wheel is coasting (818); determining when a wheel acceleration value exceeds a acceleration threshold value (826) to determine when a wheel is accelerating; determining when a wheel is accelerating (813) and when a wheel acceleration value drops below a acceleration threshold value (814) to determine when a wheel is coasting (815); determining when both of a first condition is met when if a brake actuator controller supports an abs release behavior and if said behavior is enabled (1115) then determining if a second condition is met when either a wheel is coasting or when a wheel is accelerating (1111) and when both of a first condition and a second condition are met then setting proportional gain to an accel gain value (1113); determining when a first condition is met when if a brake actuator controller supports an abs release behavior and if said behavior is enabled (1115) and if a wheel is accelerating (1111) then determining after said first condition is met that second condition is met if a said wheel is accelerating and then if said wheel transitions to either a coasting state or a decelerating state (1115) then after said second condition is met then setting a proportional gain value to a decel gain value (1114); determining if a brake actuator controller supports a maintain wheel speed behavior value and if said behavior is enabled (1112) then setting a wheel setpoint to the trailer speed value (1110); determining if a brake actuator controller supports a locally derived wheel setpoint behavior value and if said behavior is enabled then setting a wheel setpoint to a value based upon a trailer speed value; determining a brake setting (402) by calculating brake outputs (412); and controlling brakes (406) by generating braking pulses (401) at a brake setting (402) to a brake output to modulate a braking force on one of the plurality of wheels.

7. The trailer braking system according to claim 2, the method further comprising: controlling brakes by increasing a brake setting (402) value or decreasing a brake setting value and generating braking pulses (401) at a brake setting to a brake output to apply a braking force on one of a plurality of wheels; determining when a wheel interval (421) exceeds a brake test interval threshold; capturing a brake setting (402) at which a brake test interval threshold is exceeded; and providing a representation of a captured brake setting (402) value when a brake test interval threshold is exceeded on each of a plurality of wheels.

8. The method of braking the trailer according to claim 2, the method further comprising: measuring, at a brake actuator controller (102), a pulse frequency (1002) applied to a blue wire interface (109); receiving, at a brake actuator controller (102), binary messages applied to a blue wire interface (109) wherein said binary message (1004) having a high voltage threshold and a low voltage threshold relative to a static voltage level (1006) between said high voltage threshold and said low voltage threshold where said threshold values and said static voltage level are each a different percentage of a vehicle battery voltage (1005), and detecting said thresholds receiving communication signals; sending, from a brake actuator controller (102), binary messages applied to a blue wire interface wherein said binary message (1004) having a high voltage threshold and a low voltage threshold relative to a static voltage level (1006) between said high voltage threshold and said low voltage threshold where said threshold values and said static voltage level are each a different percentage of a vehicle battery voltage, and generating said thresholds for sending communication signals determining a pulse frequency (1002) applied to a blue wire interface (109) is within a communications range and then initializing serial communications which then applies said static voltage level (1006) to the blue wire interface; receiving at a blue wire interface (109) a binary message (1004) comprising a plurality of detectable high voltages and low voltages each maintained for a predetermined bit time, said high voltages exceeding said static voltage and said low voltages less than said static voltage (1006); transmitting at a blue wire interface (109) a binary message comprising a plurality of detectable high voltages and low voltages each maintained for a predetermined bit time, said high voltages exceeding said static voltage and said low voltages less than said static voltage; receiving, at a brake actuator controller, a serial communications message applied to a blue wire interface from a vehicle to apply the trailer braking system; determining a valid message is received (607) at a blue wire interface (109) then processing message (608) determining if a braking message has been received and calculating a braking setpoint (411) utilizing received braking message values; determining a brake setting (402) by calculating brake outputs (412); controlling brakes (406) by generating braking pulses (401) at a brake setting (401) to a brake output to apply a braking force on each of the plurality of wheels; and detecting at a blue wire interface (109) when either said static voltage (1006) is below said low voltage threshold exceeding a time duration or when said static voltage level exceeds said high voltage threshold exceeding a time duration or when a binary message is not received within a watchdog timeout interval (617) and then disabling serial communications (618).

9. The method of braking the trailer according to claim 8, the method further comprising: receiving, at a brake actuator controller (102), a serial communications message applied to a blue wire interface (109) from a vehicle (102) to apply the trailer braking system; determining a valid message is received at a blue wire interface (109) then processing message (608) determining if a braking message has been received; determining if a wheel setpoint (431) is received within a braking message; calculating brake outputs (412) to determine a brake setting (402) utilizing a received wheel setpoint; (431) and controlling brakes ( ) by generating braking pulses (401) at a brake setting (402) to a brake output to modulate a braking force on the one of the plurality of wheels.

10. The method of braking the trailer according to claim 8, the method further comprising: receiving, at a brake actuator controller (102), a serial communications message applied to a blue wire interface from a vehicle (102) to apply the trailer braking system; determining a valid message (607) is received at a blue wire interface then processing message (608) determining if a braking message has been received; determining a vehicle speed (419) is received within a braking message; determining a difference between trailer speed and vehicle speed (701) and when the difference exceeds a threshold value (702) then calibrating a trailer speed (709, 710) so that trailer speed (424) matches vehicle speed (419); determining if receive watchdog timer has expired (617) and then determining a trailer speed (424) based on the plurality of wheel speed signals; determining a brake setting (402) by calculating brake outputs (412); and controlling brakes (412) by generating braking pulses (401) at a brake setting (402) to a brake output to apply a braking force on the one of the plurality of wheels.

11. A trailer braking system comprising: a plurality of brake actuators; a brake actuator controller (102) capable of independently applying braking pulses from source of power of either a trailer battery input (123) or a blue wire input (109); a brake actuator controller (102) capable of measuring current form from either a trailer battery input (123) or a blue wire input (109); a brake actuator controller (102), capable of detecting different applied voltages at a blue wire interface (109), capable of measuring pulse durations and pulse intervals at a blue wire interface, a brake actuator controller (102) configured to; monitor blue input to determine the duty cycle of a PWM signal (1002) applied to a blue wire interface (109) and to set blue setting (415) to determined duty cycle value, receive at a blue wire interface (109) PWM signals (1002) and generate brake pulses (401) whose source of power is either a trailer battery input (123) or a blue wire input (109); determine the current flowing into either a trailer battery input (123) or a blue wire input (109); determine a voltage applied to a blue wire interface (109), determine when source of power is a trailer battery input (123) and when the voltage applied to a blue wire interface (109) is within a plug range (1003) and then increase controller setting (403) until said voltage applied is below said plug range and then zero controller setting, determine when the voltage applied to blue wire interface (109) indicates operation in a breakaway mode (910) then generate a maximum controller setting, calculate brake setpoints (411) and then calculate brake outputs (412) to determine a brake setting (402), and control brakes (406) by generating braking pulses (401) a brake setting (402) value to a plurality of brake outputs to apply a braking force on a plurality of wheels.

12. The trailer braking system according to claim 11, further comprising: a brake actuator controller (102) capable of measuring a frequency applied to a blue wire interface, a brake actuator controller (102) capable of performing serial communications at a blue wire interface, a brake actuator controller (102) configured to; measure a pulse frequency applied to a blue wire interface (109), receive binary messages applied to a blue wire interface (109) wherein said binary message (1004) having a high voltage threshold and a low voltage threshold relative to a static voltage level (1006) between said high voltage threshold and said low voltage threshold where said threshold values and said static voltage level are each a different percentage of a vehicle battery voltage (1005), and detect said thresholds for receive communication signals, send binary messages (1004) applied to a blue wire interface (109) wherein said binary message having a high voltage threshold and a low voltage threshold relative to a static voltage level (1006) between said high voltage threshold and said low voltage threshold where said threshold values and said static voltage level are each a different percentage of a vehicle battery voltage (1005), and generate said thresholds to send communication signals determine a pulse frequency (1002) applied to a blue wire interface (109) is within a communications range (906) and then initialize serial communications (620) which applies a said static voltage when a message is not being sent, receive at a blue wire interface (109) a binary message (1004) comprising a plurality of detectable high voltages and low voltages each maintained for a predetermined bit time, said high voltages exceeding said static voltage (1006) and said low voltages less than said static voltage, transmit at a blue wire interface (109) a binary message (1004) comprising a plurality of detectable high voltages and low voltages each maintained for a predetermined bit time, said high voltages exceeding said static voltage (1006) and said low voltages less than said static voltage, receive serial communication messages applied to a blue wire interface (109), determine if a valid message is received (607) at the blue wire interface and then process message (608), determine if a braking message is received and update a brake setting (402) utilizing a received braking message, and control brakes (406) by generating braking pulses (401) of a duty cycle determined by a brake setting (402) value applied to a brake output to set a braking force on each of a plurality of wheels, and detect at a blue wire interface (109) when either said static voltage is below said low voltage threshold exceeding a time duration or when said static voltage level exceeds said high voltage threshold exceeding a time duration or when a binary message (1004) is not received within a watchdog timeout interval (617) and then disable serial communications (618).

13. The trailer braking system according to claim 12, wherein the brake actuator controller is further configured to: receive serial communication messages applied to a blue wire interface (109), determine if a valid message (607) is received at the blue wire interface and then process message (608), determine if a braking message is received and determine if a vehicle speed (419) is received within a braking message, and determine a difference between the trailer speed (701) and the vehicle speed and when said difference exceeds a threshold value (702) then calibrate a trailer speed (709, 710) so that trailer speed (424) matches the received vehicle speed (419).

14. The trailer braking system according to claim 11, further comprising: a brake actuator controller (102) capable of sending and receiving messages over a CAN technology based trailer network, receive at a brake actuator controller (102) messages from a trailer network interface (122) to apply the trailer braking system, and a brake actuator controller (102) configured to determine a valid message is received (607) at the trailer network interface and if valid then process message (608) and if is determined to be a braking message then update a brake setpoint utilizing values within braking message, calculate brake setpoints and then calculate brake outputs to determine a brake setting (402), and control brakes (406) by generating braking pulses (401) at a brake setting (402) value to a plurality of brake outputs to apply a braking force on a plurality of wheels.

15. The trailer braking system according to claim 11, further comprising a plurality of wheel speed sensors; a brake actuator controller (102) capable of receiving wheel speed signals from a plurality of wheel speed sensors (306,307,308,309), and a brake actuator controller (102) configured to receive a plurality of wheel speed signals from a plurality of wheel speed sensors (306,307,308,309), determine a wheel speed (423) of one of a plurality of wheels based on one of a plurality of wheel speed signals, determine trailer speed (424) based on a plurality of wheel speed signals, determine a proportional error by subtracting a wheel speed from a trailer speed (1101), determine a proportional output by multiplying a proportional error times a proportional gain value (1102), calculate brake setpoints (411) and determine a brake setting (402) by subtracting a proportional output value from a braking setpoint value, and control brakes (406) by generating braking pulses (401) at a brake setting (402) to a brake output to modulate a braking force on the one of the plurality of wheels.

16. The trailer braking system according to claim 15, wherein the brake actuator controller is further configured to: controlling brakes (406) by increasing a brake setting (402) value or decreasing a brake setting value and generating braking pulses (401) at a brake setting to a brake output to apply a braking force on one of a plurality of wheels, determine when a wheel interval (421) exceeds a brake test interval threshold, capture a brake setting (402) at which brake test interval threshold is exceeded, and provide a representation of a captured brake setting (402) value where said brake test interval threshold is exceeded on each of a plurality of wheels.

17. The trailer braking system according to claim 15, wherein the brake actuator controller is further configured to: determine a wheel acceleration value based on the plurality of wheel speed signals, determine a derivative contribution (1104) value based on a wheel acceleration value, determine a pid output value including a derivative contribution value, determine a brake setting (402) by subtracting a pid output value from a braking setpoint value, and control brakes (406) by generating braking pulse (401) s at a brake setting (402) to a brake output to modulate a braking force on the one of the plurality of wheels.

18. The trailer braking system according to claim 14, wherein the brake actuator controller (102) is further configured to: determine an integral contribution (1103) based upon a plurality of wheel speed signals, determine a pid output value including an integral contribution, determine a brake setting by subtracting a pid output value from a braking setpoint value, and control brakes (406) by generating braking pulses (401) at a brake setting (402) to a brake output to modulate a braking force on the one of the plurality of wheels.

19. The trailer braking system according to claim 14, wherein the brake actuator controller (102) is further configured to: determine a wheel acceleration value, either positive or negative, based on a plurality of wheel speed signals, determine when a wheel deceleration exceeds a deceleration threshold value to determine when a wheel is decelerating, determine when a wheel is decelerating and a wheel deceleration drops below a deceleration threshold value to determine when a wheel is coasting, determine when a wheel acceleration exceeds a acceleration threshold value to determine when a wheel is accelerating, determine when a wheel is accelerating (813) and a wheel acceleration drops below a acceleration threshold value (814) to determine when a wheel is coasting (815), determine when both of first condition is met when if a brake actuator controller supports an abs release behavior and if said behavior is enabled (1115) then determine if a second condition is met when either a wheel is coasting or when a wheel is accelerating (1111) and when both of a first condition and a second condition are met then setting proportional gain to an accel gain value (1113), determine when a first condition is met when if a brake actuator controller supports an abs release behavior and if said behavior is enabled (1115) and if a wheel is accelerating (1111) then determining after said first condition is met that a second condition is met if a said wheel is accelerating and then if said wheel transitions to either a coasting state or a decelerating state (1115) then after said second condition is met then setting a proportional gain value to a decel gain value (1114), determine when a brake actuator controller supports a maintain wheel speed behavior and if supported and enabled (1112) then set a wheel setpoint to the trailer speed value (1110), determine if a brake actuator controller supports a locally derived wheel setpoint behavior value and if said behavior is enabled then setting a wheel setpoint to a value based upon a trailer speed value, determine a brake setting (402) by calculating brake outputs (412), and control brakes (406) by generating braking pulses (401) at a brake setting (402) to a brake output to modulate a braking force on the one of the plurality of wheels.

* * * * *